US007905201B2

(12) United States Patent
Greene et al.

(10) Patent No.: US 7,905,201 B2
(45) Date of Patent: Mar. 15, 2011

(54) AUTOMATED SYSTEMS FOR FEEDING ANIMALS AND COLLECTING ANIMAL EXCREMENT

(75) Inventors: Jeffrey Hayden Greene, Englewood, OH (US); Kimberly Marie Adams, Vandalia, OH (US); Charlie Thomas Goubeaux, West Manchester, OH (US); Susan C. Manos, Lewisburg, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 219 days.

(21) Appl. No.: 12/355,185

(22) Filed: Jan. 16, 2009

(65) Prior Publication Data
US 2009/0250012 A1 Oct. 8, 2009

Related U.S. Application Data

(60) Provisional application No. 61/011,280, filed on Jan. 16, 2008.

(51) Int. Cl.
*A01K 1/03* (2006.01)
(52) U.S. Cl. .................................................. 119/421
(58) Field of Classification Search ............. 119/51.01, 119/51.02, 161, 163, 164, 417, 421, 442, 119/458, 479, 165, 170; 700/90; 702/173; 340/573.1
See application file for complete search history.

(56) References Cited

U.S. PATENT DOCUMENTS

| 2,684,051 | A | * | 7/1954 | Leblond et al. | 119/417 |
| 3,107,650 | A | * | 10/1963 | Cass | 119/417 |
| 3,227,139 | A | * | 1/1966 | Gass et al. | 119/417 |
| 3,228,375 | A | * | 1/1966 | Philippe | 119/417 |
| 3,771,491 | A | * | 11/1973 | Hunter | 119/163 |
| 4,036,178 | A | | 7/1977 | Lee et al. | |
| 4,154,196 | A | * | 5/1979 | Gass | 119/417 |
| 4,181,612 | A | | 1/1980 | Trail | |
| 4,326,481 | A | | 4/1982 | Gruss | |
| 4,382,527 | A | | 5/1983 | Lerner | |
| 4,649,578 | A | | 3/1987 | Vargo | |
| 4,729,342 | A | | 3/1988 | Loctin | |
| 4,785,765 | A | * | 11/1988 | Campbell et al. | 119/417 |
| 5,353,743 | A | | 10/1994 | Walton | |
| 5,458,090 | A | * | 10/1995 | Favreau | 119/163 |
| 5,570,655 | A | | 11/1996 | Targa | |

(Continued)

FOREIGN PATENT DOCUMENTS
DE 43 03 001 A1 8/1994
(Continued)

OTHER PUBLICATIONS

Metabolic Cage for Rats, http://www.colinst.com/brief.php?id=60, download Jun. 9, 2009.

(Continued)

*Primary Examiner* — Rob Swiatek
*Assistant Examiner* — Ebony Evans
(74) *Attorney, Agent, or Firm* — Adam W. Borgman; Kim William Zerby

(57) ABSTRACT

An automated feeding station feeds an animal in a feeding event. An automated collection system, such as a urine collection system, fecal collection system, or combination urine/fecal collection system, collects and excrement from the animal in an excrement elimination event. The feeding event and excrement elimination events provide insights into the health of the animal.

25 Claims, 11 Drawing Sheets

U.S. PATENT DOCUMENTS

| | | | |
|---|---|---|---|
| 5,596,948 A * | 1/1997 | Ritchie | 119/417 |
| 6,044,795 A | 4/2000 | Matsuura et al. | |
| 6,079,363 A | 6/2000 | MacLaine | |
| 6,079,364 A | 6/2000 | Tamba | |
| 6,138,609 A | 10/2000 | Gordon | |
| 6,205,954 B1 | 3/2001 | Bogaerts | |
| 6,349,671 B1 | 2/2002 | Lewis et al. | |
| 6,367,417 B1 | 4/2002 | Gal et al. | |
| 6,367,418 B1 | 4/2002 | Ulman et al. | |
| 6,523,495 B1 | 2/2003 | Rydman | |
| 6,556,948 B1 * | 4/2003 | McKenna | 702/173 |
| 6,561,132 B2 | 5/2003 | Gordon et al. | |
| 6,615,764 B2 | 9/2003 | Voogd et al. | |
| 6,647,923 B2 | 11/2003 | Nicoud et al. | |
| 6,651,584 B2 | 11/2003 | Van den Berg | |
| 6,684,810 B2 | 2/2004 | Martin | |
| 6,805,074 B2 * | 10/2004 | Newcomb et al. | 119/51.01 |
| 6,857,391 B1 | 2/2005 | Gantt | |
| 7,073,459 B2 | 7/2006 | Larsen | |
| 7,107,933 B2 | 9/2006 | Mohr | |
| 7,108,662 B2 | 9/2006 | Miller et al. | |
| 7,114,464 B1 | 10/2006 | Chang | |
| 7,124,707 B1 | 10/2006 | Clarke | |
| 7,228,816 B2 | 6/2007 | Turner et al. | |
| 7,418,303 B2 * | 8/2008 | van de Ligt et al. | 700/90 |
| 2002/0134313 A1 | 9/2002 | King et al. | |
| 2004/0129232 A1 | 7/2004 | Northrop et al. | |
| 2005/0061252 A1 | 3/2005 | Meeks et al. | |
| 2005/0224003 A1 | 10/2005 | Yin et al. | |
| 2005/0224005 A1 | 10/2005 | Kim | |
| 2005/0284382 A1 | 12/2005 | Stantchev et al. | |
| 2006/0000296 A1 | 1/2006 | Salter | |
| 2006/0081191 A1 | 4/2006 | Deasy et al. | |
| 2006/0112898 A1 | 6/2006 | Fjelstad et al. | |
| 2006/0137619 A1 | 6/2006 | Dodman et al. | |
| 2006/0201432 A1 | 9/2006 | Pratt | |
| 2006/0201437 A1 | 9/2006 | Ryan | |
| 2006/0213448 A1 | 9/2006 | Yasukawa | |
| 2006/0249088 A1 | 11/2006 | Eu | |
| 2006/0249090 A1 | 11/2006 | Ahad | |
| 2006/0252366 A1 | 11/2006 | Eu | |
| 2007/0051317 A1 | 3/2007 | Bruner | |
| 2007/0054413 A1 | 3/2007 | Aviles et al. | |
| 2007/0056520 A1 | 3/2007 | Hamada | |
| 2007/0089684 A1 | 4/2007 | Brooks et al. | |
| 2007/0113791 A1 * | 5/2007 | Burghardi et al. | 119/51.02 |
| 2007/0125306 A1 | 6/2007 | Beecher | |
| 2007/0137584 A1 | 6/2007 | Travis | |
| 2007/0144448 A1 | 6/2007 | Fairhall | |
| 2007/0288249 A1 * | 12/2007 | Rowe et al. | 705/1 |
| 2008/0196672 A1 * | 8/2008 | Mokhtarian et al. | 119/421 |

FOREIGN PATENT DOCUMENTS

| | | |
|---|---|---|
| DE | 103 50 844 A1 | 6/2005 |
| EP | 0331219 A1 | 9/1989 |
| EP | 1 230 850 A | 8/2002 |
| EP | 1 312 311 A | 5/2003 |
| FR | 2671949 A3 | 7/1992 |
| JP | 2006/000102 A2 | 1/2006 |
| JP | 2006/226919 A2 | 8/2006 |
| WO | WO 90/05448 | 5/1990 |

OTHER PUBLICATIONS

Sitaraman et al. , "A Novel Approach to Combining Automated Sample Collection, Extraction and Analysis to Obtain PK/PD Information for Preclinical Studies", http://www.basinc.com/library/presentations/pdf/Sitar-02.pdf, downloaded Jun. 9, 2009.

Kissinger et al., "Automated blood sampling from awake laboratory animals coupled to 96-well sample preparation tools and LC/MS.MS improves data quality, enhances efficiency and facilitates measurement of behaviour and physiological parameters" Drug analysis Apr. 22-25, 2002, Bruges, Reference: www.culex.net.

Gunaratna et al. "An Automated Blood Sampler for Pharmacokinetic and Pharmacodynamic Studies", http://www.basinc.com/library/presentations/pdf/Chan-08.pdf, downloaded Jun. 9, 2009.

International Search Report—4 Pages PCT/US2009/031096.

* cited by examiner

AUTOMATED SYSTEMS FOR FEEDING ANIMALS AND COLLECTING ANIMAL EXCREMENT

CROSS REFERENCE TO RELATED APPLICATION

This application claims the benefit of U.S. Provisional Application No. 61/011,280, filed Jan. 16, 2008.

FIELD OF THE INVENTION

In a feeding event, an automated feeding station presents food to an animal after detecting the presence of the animal. In an excrement elimination event, an automated collection system collects excrement eliminated from the animal. The feeding event and excrement elimination event may provide insight into the impact of the diet on the metabolic and physiological health of the animal.

BACKGROUND OF THE INVENTION

Pet owners, professionals in the agricultural field, veterinarians and biological scientists need to be able to evaluate an animal's general health. Decades of research in many scientific disciplines have been able to define physiological activities/norms and biochemical pathways that are necessary to maintain homeostasis and a normal state in all species.

In the scientific area of nutrition, a common question, regardless of the species, is how much of the energy (Kcal) fed to an animal is metabolized. Historically, getting scientific answers to how much of a particular diet has been metabolized has been accomplished by conducting feeding trials using a statistically relevant number of animals for a prescribed number of days. One of the short-comings when conducting these trials is that social animals (pack/herd species) must be isolated to ensure that the amount of food consumed and the subsequent waste (feces and urine) that are collected can be specifically identified to each test animal. This is commonly accomplished by separating animals into stanchions, pens, kennels, metabolism cages or paddocks. This separation prevents an animal from maintaining normal social interactions and restricts normal movement or natural behavior which in turn can create significant stress, discomfort, or unnatural elimination patterns, all of which can affect excrement samples.

Additionally, in the domestic cat, for example, there is a unique health concern related to urinary tract health. Commercially developed diets for cats have unique ingredient requirements, such as Taurine, and the mineral balance of diets can influence the urinary pH level. Most cat diets currently are formulated to slightly acidify the cat's urine to maintain urinary tract health. Lower urinary tract disease left untreated can result in morbidity or mortality. Lower urinary tract disease can also lead to inappropriate excrement elimination issues which can result in euthanasia or abandonment. Two collection methods are used to collect urine samples from cats participating in nutritional trials or when cat owners suspect urinary tract problems in the veterinary clinic. The first collection method requires the cat to be isolated in a cage until a urine sample is voided. Fresh urine samples must be evaluated immediately or there is a chance of bacterial contamination. An additional risk is the urine pH and chemical composition of the urine is altered by the oxidation process. Cystocentesis is the second collection method in which a veterinarian is required to insert a needle through the lower abdominal cavity and into the bladder to obtain a sterile sample. Cystocentesis, however, provides a single point in time sample which may not be indicative of the overall health of the urinary tract. While this method produces a very good sample, it can create stress to the animal during the collection process and may introduce some hemolysis into the sample.

There remains a need for an improved method for feeding animals and subsequently collecting the animal's excrement. There remains a need for an automated collection system to collect excrement samples from animals in a multi-animal environment. There remains a need for an automated collection system to collect excrement samples from an animal in a non-invasive manner. There remains a need for an understanding of the impact of an animal's diet on urinary tract and gastrointestinal tract health.

SUMMARY OF THE INVENTION

A method to collect excrement and excrement elimination data from group-housed animals in an excrement elimination event, the method comprising the steps of a) providing a primary enclosure; b) providing at least two animals within said primary enclosure; c) providing at least one automated collection system within said primary enclosure, said automated collection system comprising a collection system detection means for detecting an animal, an excrement sample collection area, at least two storage containers; d) associating an identifier with each of said animals; e) detecting one of said identifiers within said excrement sample collection area with said detection means in an excrement elimination event; f) collecting said detected animal's excrement from said sample collection area; and g) obtaining excrement elimination event data.

The automated collection system is selected from the group consisting of a urine collection system, a fecal collection system, a combination urine/fecal collection system and combinations thereof. The excrement is selected from the group consisting of urine, feces and combinations thereof.

The method may further comprise the steps of: a) providing an automated feeding station within said primary enclosure, said automated feeding station comprising a feeding area, a food container comprising a food suitable for consumption by an animal; b) detecting one of the identifiers within said feeding area; c) presenting the food container to the animal; d) feeding said detected animal in a feeding event. The method may further comprise the step of correlating the feeding event of the animal to the excrement elimination event of the animal.

A primary enclosure comprising an automated collection system and an automated feeding station. The automated collection system is selected from the group consisting of a urine collection system, a fecal collection system, a urine/fecal collection system and combinations thereof.

DETAILED DESCRIPTION OF THE INVENTION

Figure 1:
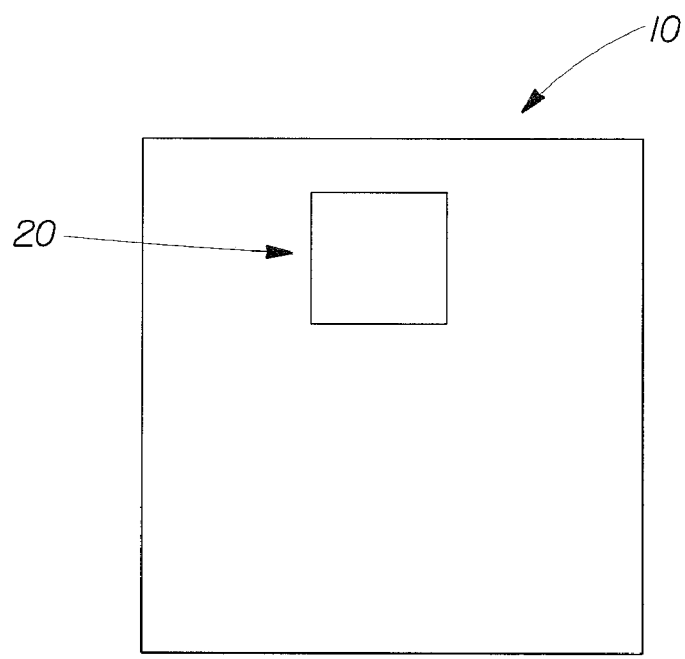
FIG. 1 illustrates a schematic plan view of a primary enclosure comprising an automated collection system.

A method for collecting excrement in a non-invasive manner from animals living in a group-housed environment is described herein. An animal eliminates excrement in an automated collection system in what is called an excrement elimination event. The excrement is collected and temporarily stored within the automated collection system. Excrement elimination event data is obtained regarding the excrement elimination event and stored in a data file for the automated collection system. The automated collection system described herein allows one of ordinary skill in the art to obtain excrement elimination event data that is otherwise difficult to obtain under common methodologies without imposing some physical and emotional stress on the animals under study that could subsequently impact the quality of the data as well. An automated collection system may use fewer numbers of animals in a research study and reduce the need for human interaction in the collection of excrement samples from the animals while obtaining larger quantities of samples without jeopardizing the quality of the data. Larger quantities of samples are collected as the animals are able to follow their own natural habits and routines and produce excrement samples as they would naturally. Use of an automated collection system also allows for the ability to track changes in excrement samples, such as urine pH, without the need for invasive techniques.

In addition to the use of an automated collection system, animals living in the group-housed environment may consume food located in an automated feeding station in what is called a feeding event. Feeding event data, such as, the time of the feeding event and the amount of food consumed in the feeding event is stored in a data file for the automated feeding station.

The automated collection system and the automated feeding station associate with any software or hardware determined to be suitable by one of ordinary skill for data collection, storage and analysis. A data processing system may receive, process, store, and print data and may comprise a processing unit, a user input device and a printer. The processing unit may be programmed to control the operation of the automated collection system and the automated feeding station. The automated collection system and the automated feeding station may be programmed to operate independent of human interaction for a time period determined to be suitable by one of ordinary skill. In an embodiment, the time period may be a duration of time such as hours or days. In such an embodiment, the time period may be about 2, 4, 6, 8, 10, 12, 16, 20, 24, or 48 hours. In an embodiment, the time period may be a duration of time between events such as servicing events. In such an embodiment, servicing events include, but are not limited to, placing food in food containers, washing the food containers, removal of stored excrement samples and/or stored waste from a storage area of the automated collection system, calibration of the automated collection system and/or automated feeding station, routine maintenance of the automated collection system and/or automated feeding station, and combinations thereof.

Feeding event data and excrement elimination event data provide insights regarding the impact of a diet on the health of an animal, such as the urinary tract and the gastrointestinal system of the animal. In an embodiment, collected pH data identifies when a diet is causing a variance in urine pH level in an animal. In an embodiment, collected pH data identifies a shift in urine pH between acidic and basic during a transition to a new diet. In an embodiment, urine energy loss is evaluated. In an embodiment, a model is developed regarding urine pH. In an embodiment, the excrement elimination event data and feeding event data provide insights as to when and how diet ingredient changes have affected urine pH, urine volume, fecal weight, fecal volume, and stool quality and appearance. In an embodiment, the excrement elimination event data and feeding event data provide insights into the digestible energy, ingredient utilization and protein quality, which provides better understanding of the animal's energy requirements and diet energy utilization. In an embodiment, the time elapsed between a feeding event and an excrement elimination event provide insights into the impact of a diet on the health of an animal such as the urinary tract health and gastrointestinal tract health of the animal. Correlating feeding event data to excrement elimination event data, such as, for example, as described above, may allow for an evaluation of the impact of a diet composition on an animal's urinary tract health, gastrointestinal health or combinations thereof.

At least two animals are group-housed within a primary enclosure. The term "primary enclosure" refers herein to any structure or device used to restrict an animal or animals to a limited amount of space, such as a room, pen, run, cage, compartment, pool or hutch. Each animal within the primary enclosure is free to interact with the surrounding environment which may include, but is not limited to, humans, other animals, inanimate objects, and combinations thereof. Each animal within the primary enclosure is free to move about the primary enclosure and follow their own normal routine and daily living habits. In an embodiment, the primary enclosure is a group-housed environment. In an embodiment, the primary enclosure mimics a home environment. Each animal within the primary enclosure may be a companion animal. The term "companion animal" refers herein to a dog, cat, rabbit, guinea pig, hamster, gerbil, or ferret.

Each animal within the primary enclosure is identified by an identifier which allows each animal to be individually identified. When an animal is detected in an automated feeding station, the identifier allows for the food designated for consumption by the identified animal to be presented to the identified animal for consumption if there is food available. When an animal is detected in an automated collection system, the identifier allows for any excrement sample collected from the animal to be attributed to that animal. Non-limiting examples of identifiers include ear tags, bar codes, hair coloration, hair patterns, weight, infrared emissions, ultrasonic emissions, RF emissions, and an identification transponder such as an RFID chip or global positioning system locator, and combinations thereof. For example, an identification transponder may be attached to the collar of the animal or it may be subcutaneously implanted into the animal, such as between the shoulder blades of the animal, and combinations thereof.

The primary enclosure comprises at least one automated collection system. An automated collection system allows an animal to voluntarily urinate and/or defecate according to the animal's own natural habit and routine. The voluntary elimination of excrement reduces the tension and stress of an animal such as may be experienced during current excrement sample collection methodologies. The automated collection system comprises a collection system detection means for detecting an animal, an excrement sample collection area, and at least two excrement storage containers. In an embodiment, the automated collection system further comprises a data collection chamber. An automated collection system collects and stores a fresh excrement sample from an animal without the need for human intervention or interaction. Excrement elimination event data is obtained when an animal utilizes the automated collection system. Excrement elimination event data comprises collection system utilization data, technical data, and combinations thereof. Non-limiting examples of collection system utilization data includes, the identity of an animal utilizing the automated collection system, when an animal enters or exits the automated collection system, the date of the excrement elimination event, the time the animal entered the automated collection system, the time the animal exited the automated collection system, the time of each excrement sample storage container, within which the excrement sample is stored and its location within the automated collection system, an experiment code, and combinations thereof. Technical data is also obtained regarding the excrement sample deposited by the animal. Non-limiting examples of technical data includes, the volume of the excrement sample, the weight of the excrement sample, the osmolarity of the excrement sample, the collection and characterization of crystals, the ion content of the excrement sample, such as, but not limited to, sodium ($Na^+$), potassium ($K^+$), hydrogen ($H^+$), calcium ($Ca^{2+}$), magnesium ($Mg^{2+}$), chloride ($Cl^-$), citrate ($C_3H_5O(COO)_3^{3-}$), sulfate ($SO_4^{2-}$), oxalate ($C_2O_4^{2-}$), uric acid ($C_5H_4N_4O_3$), ammonium pyrophosphate, and phosphorous ($P^{3+}$) ion content, the pH of the excrement sample, specific gravity, an electronic image of the excrement sample, stool quality and combinations thereof. Technical data regarding the excrement sample may be obtained when the excrement sample is within the excrement sample collection area, when the excrement sample is within a data collection chamber or combinations thereof. The excrement elimination event data regarding the utilization of the automated collection system and the technical data regarding the excrement sample is stored in a data file. It should be realized that more than one excrement elimination event may occur in a given time period and additional excrement elimination event data may be obtained and stored in a data file during the given time period. Additional excrement elimination event data which may be stored in the data file includes the information as listed above as well as the number of urinations in a given time period such as a 24-hour time period, average volume per urination, diet related urine pH changes, diet related urine volume changes, diet related urine frequency changes, changes in urine factors based upon feeding patterns or diet matrix, stool quality over time, number of defecations in a given time period such as a 24-hour period, average weight per defecation over time, diet related fecal changes, diet related fecal weight changes, diet related fecal frequency changes, and combinations thereof.

The automated collection system individually stores collected excrement samples and prevents cross-contamination of the excrement samples during storage. The automated collection system may store multiple excrement samples from multiple animals and, therefore, may collect more samples than what may otherwise be collected under current methodologies. The automated collection system is selected from the group consisting of a urine collection system, a fecal collection system, a combination urine/fecal collection system, and combinations thereof. FIG. 1 illustrates a primary enclosure 10 comprising an automated collection system 20. For example, the primary enclosure 10 is a room comprising four walls and a single automated collection system 20.

Figure 2:
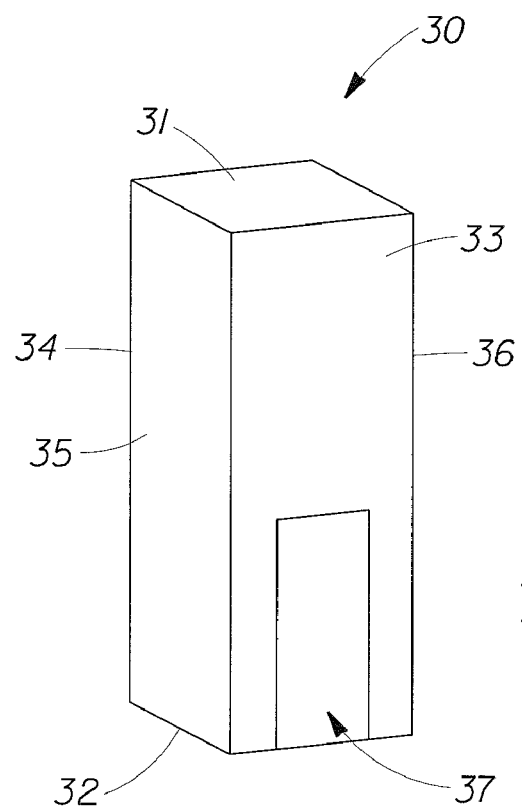
FIG. 2 illustrates a perspective view of an embodiment of an automated collection system.
Figure 3:
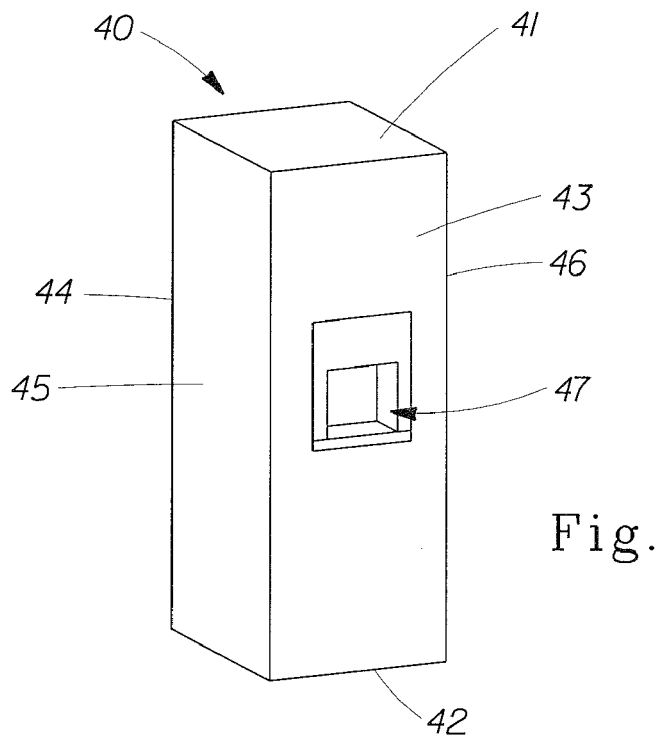
FIG. 3 illustrates a perspective view of an embodiment of an automated collection system.

The automated collection system is configured in any manner determined to be suitable by one of ordinary skill. In an embodiment, the entrance of the automated collection system is level with the ground of the primary enclosure. In such an embodiment, an animal walks directly into the automated collection system. FIG. 2 illustrates a perspective view of an embodiment of an automated collection system 30. The automated collection system 30 comprises a top wall 31, bottom wall 32, front wall 33, rear wall 34, and side walls 35 and 36. The automated collection system 30 comprises an entrance 37 through which an animal enters the automated collection system 30. The entrance 37 allows an animal to walk directly into the automated collection system 30 as the entrance is level with the ground of the primary enclosure. In an embodiment, the entrance of the automated collection system is elevated above the ground of the primary enclosure. In such an embodiment, an animal accesses the automated collection system by use of stairs, ramps, lifts, jumping, and combinations thereof. FIG. 3 illustrates a perspective view of an embodiment of an automated collection system 40. The automated collection system 40 comprises a top wall 41, bottom wall 42, front wall 43, rear wall 44, and side walls 45 and 46. The automated collection system 40 comprises an elevated entrance 47 through which an animal enters the automated collection system 40.

Figure 4:
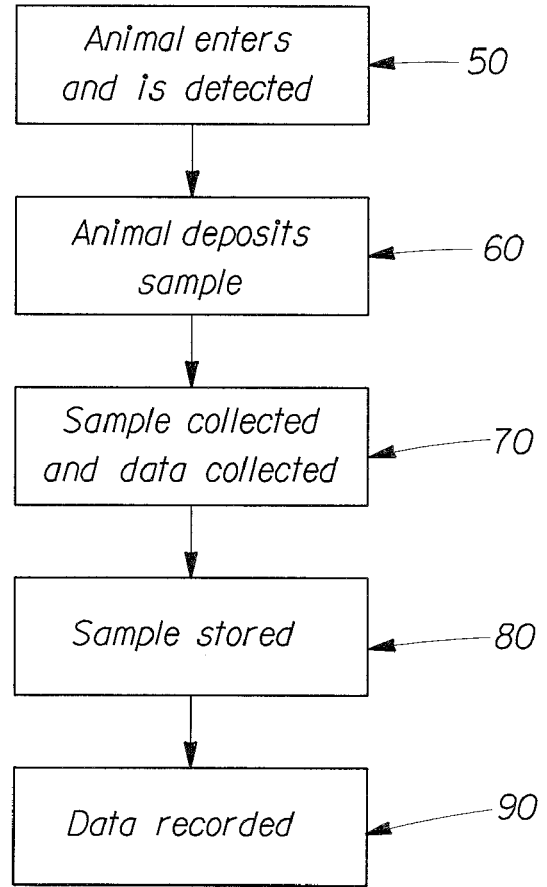
FIG. 4 illustrates a flow diagram of an embodiment of the method of use of an automated collection system.

FIG. 4 illustrates a flow diagram of an embodiment of the method of use of the automated collection system. The steps, as illustrated, are: Step 1, 50, the animal enters the automated collection system and is detected by the automated collection system, Step 2, 60, the animal deposits an excrement sample within the excrement sample collection area, Step 3, 70, excrement elimination event data is obtained and the excrement sample is collected, Step 4, 80, the collected excrement sample may be stored in a storage container, and Step 5, 90, the excrement elimination event data is recorded in a data file. It should be recognized that the order listed and illustrated is a non-limiting order. In an embodiment, the excrement elimination event data may be recorded prior to the storage of the collected excrement sample.

A collection system detection means for detecting the animal may be placed in, on, or near the automated collection system. The collection system detection means detects the identifier of the animal. The detection occurs by any method that complements the animal's identifier, such as, but not limited to, visual recognition, weight sensor, bar code reader, infrared sensor, RF sensor, ultrasonic sensor, and combinations thereof. In an embodiment, the detection means comprises an RF sensor and complements the animal's RFID chip. In an embodiment, the collection system detection means comprises an ultrasonic sensor and complements the animal's ultrasonic emissions. In an embodiment, the collection system detection means comprises a visual recognition detector and can detect the animal through visual pattern recognition of hair patterns or hair coloration. Detection of the animal's identifier provides the automated collection system with the identity of the animal which is recorded in a data file. The time the identifier is detected, the time the animal enters the automated collection system, the time the animal uses the automated collection system, the time the animal exits the automated collection system, and combinations thereof are also recorded in a data file. In an embodiment, the automated collection system comprises an excrement sample collection area and the collection system detection means is located within the excrement sample collection area. In an embodiment, the automated collection system comprises an entrance to an excrement sample collection area and the collection system detection means is located within the entrance to the excrement sample collection area. In an embodiment, the automated collection system comprises a door to the excrement sample collection area and the collection system detection means is located on the door to the excrement sample collection area. In an embodiment, the automated collection system comprises a top surface, such as a roof, and the collection system detection means is located on the roof of the automated collection system. In an embodiment, the automated collected system comprises a weigh scale over which the animal must traverse and the collection system detection means is associated with the weigh scale.

The automated collection system comprises an excrement sample collection area. The excrement sample collection area is any area of the automated collection system that provides a location for an animal to deposit an excrement sample. The excrement sample collection area provides enough space for an animal as determined to be suitable by one of ordinary skill in the art to allow for a single animal to enter into and occupy the excrement sample collection area. The excrement sample collection area comprises a flooring upon which an animal stands when in the excrement sample collection area. In an embodiment, the excrement sample collection area further comprises walls, such as side walls and a top wall.

The presence of an animal within the excrement sample collection area of an automated collection system may provide an indication to the automated collection system to engage in additional actions. Such actions may include, but are not limited to, preventing a second animal from entering the excrement sample collection area, collecting an excrement sample upon the exit of the animal from the excrement sample collection area, performing a flush cycle upon the exit of the animal from the excrement sample collection area, and combinations thereof. Prevention of a second animal from entering an occupied excrement sample collection area reduces or prevents the risk of cross-contamination of excrement samples. Entrance of a second animal into the excrement sample collection area is prevented by any method determined to be suitable by one of ordinary skill. Suitable methods include, but are not limited to, doors, walls, fences, chains, water jets, and combinations thereof. Collection of an excrement sample and performance of a flush cycle are further detailed below.

The presence of an animal within the excrement sample collection area is determined by any method suitable to one of ordinary skill. Suitable methods include, but are not limited to, infrared beams, weigh scales, thermal imaging, ultrasonic sensor, RF sensor, and combinations thereof.

Figure 5:
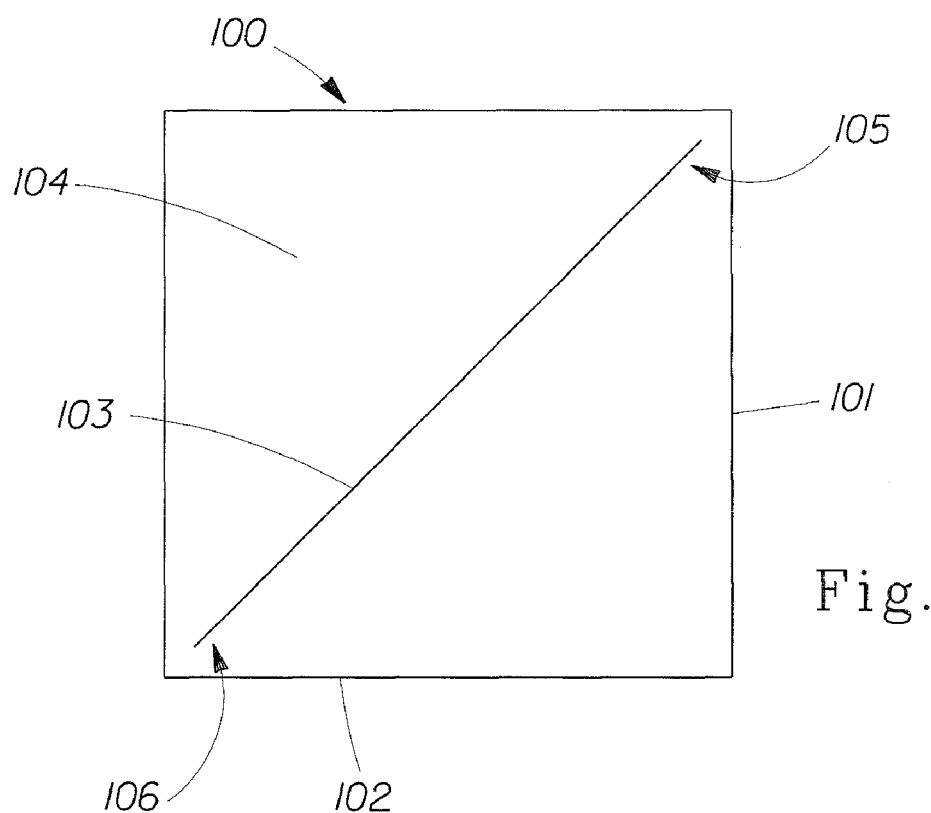
FIG. 5 is a side view of an excrement sample collection area.
Figure 6:
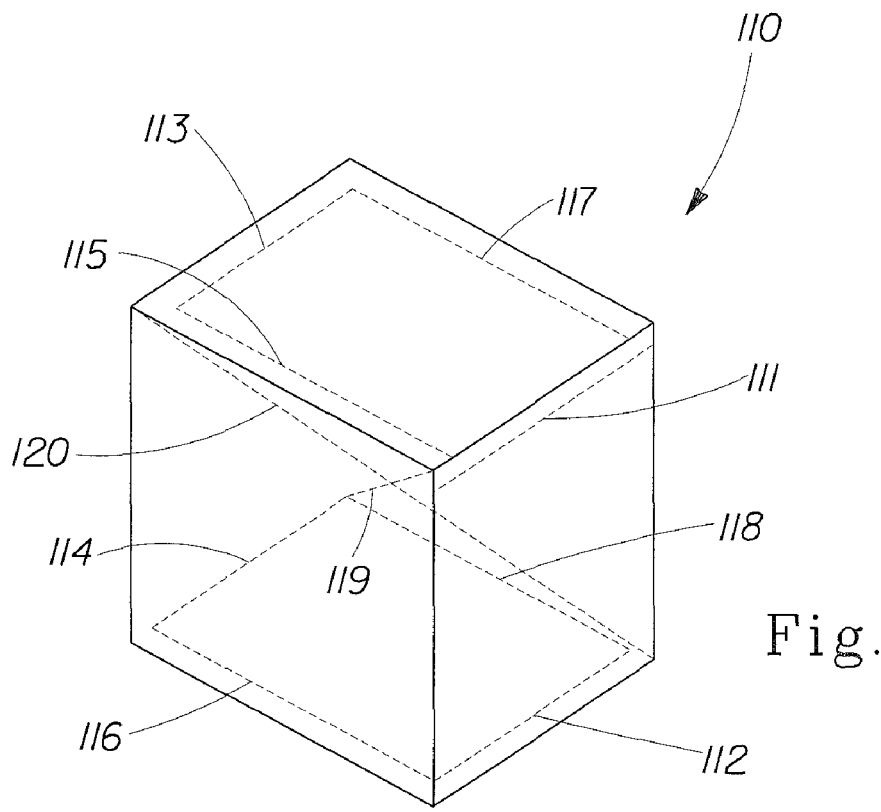
FIG. 6 illustrates a perspective view of an embodiment of an excrement sample collection area and non-limiting locations of infrared beams within the excrement sample collection area.
Figure 7:
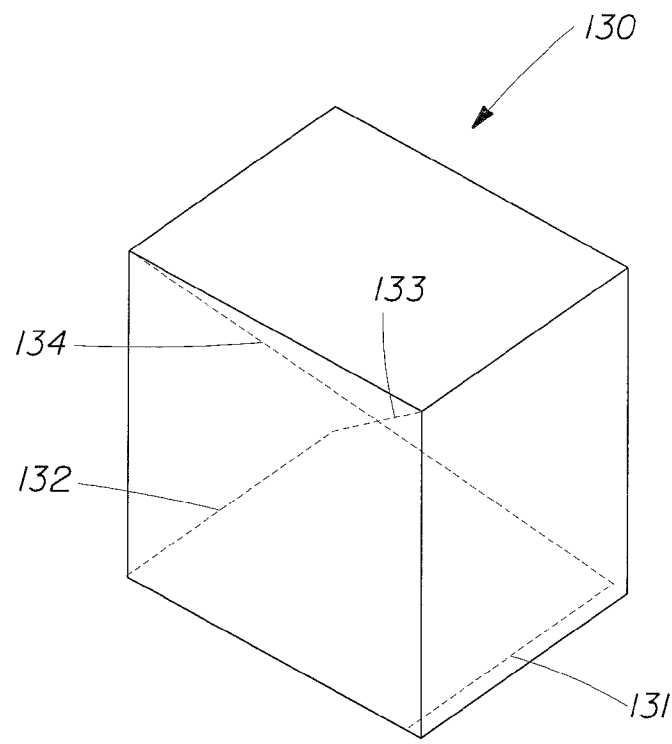
FIG. 7 illustrates a perspective view of an embodiment of an excrement sample collection area comprising infrared beams.

FIG. 5 is a side view of an excrement sample collection area 100. The excrement sample collection area 100 comprises an entrance 101, a flooring 102 and an infrared beam 103. The infrared beam 103 is positioned within the excrement sample collection area 100 to detect movement of or the presence of an animal within the excrement sample collection area 100. The infrared beam 103 remains in an unbroken state and is broken when an animal moves into the line of the infrared beam 103. A broken infrared beam, therefore, provides an indication to the automated collection system that an animal is present within the excrement sample collection area of the automated collection system. The infrared beam 103 illustrated in FIG. 5 passes diagonally through the void area 104 of the excrement sample collection area 100 from a top front location 105 to a back bottom location 106. The excrement sample collection area 100 may comprise multiple infrared beams which may be arranged in any pattern that will allow for the detection of the movement or the presence of an animal within the excrement sample collection area 100. FIG. 6 illustrates a perspective view of an embodiment of an excrement sample collection area 110 and non-limiting locations of the infrared beams within the excrement sample collection area 110: front top 111, front bottom 112, back top 113, back bottom 114, left side top 115, left side bottom 116, right side top 117, right side bottom 118, diagonally from a front top to a back bottom 119, diagonally from a front bottom to a back top 120, and combinations thereof. The infrared beams crossing diagonally, 119 and 120, through the excrement sample collection area 104 may, but need not, intersect. FIG. 7 illustrates a perspective view of an embodiment of an excrement sample collection area 130 comprising infrared beams. Infrared beams may be located at the following locations in such an embodiment: front bottom 131, back bottom 132, diagonally from front top to back bottom 133, and diagonally from front bottom to back top 134. The infrared beams are oriented such that at least one infrared beam is broken when an animal is present in the excrement sample collection area.

An infrared beam may be broken for any length of time as determined to be suitable by one of ordinary skill to indicate the presence of an animal within the excrement sample collection area. In an embodiment, the infrared beam is broken for at least about 0.5 sec. In addition to indicating the presence of an animal within the excrement sample collection area, a broken infrared beam also prevents the automated collection system from performing a flush cycle. It would be detrimental to perform a flush cycle when an infrared beam is broken as that may cause harm to the animal present within the excrement sample collection area. In an embodiment, in the event the automated collection system is performing a flush cycle and an infrared beam becomes broken during the flush cycle, the flush cycle may cease to continue and the automated collection system may shut down until it is checked for the presence of an animal in the excrement sample collection area.

The flooring of the excrement sample collection area may be configured in any manner determined to be suitable by one of ordinary skill in the art. In an embodiment, the flooring is located on the ground of the primary enclosure. In an embodiment, the excrement sample collection area is defined by a perimeter and the flooring is contained within the perimeter. In an embodiment, the flooring comprises upwardly extending walls which may form sidewalls of the excrement sample collection area. In an embodiment, the excrement sample collection area comprises walls which are not connected to the flooring. In an embodiment, the flooring may be supported within the automated collection system by any manner known to one of ordinary skill including, but not limited to, a support frame, support rods, axis pivot rods, a conveyor belt-like guide track, and combinations thereof.

Figure 8:
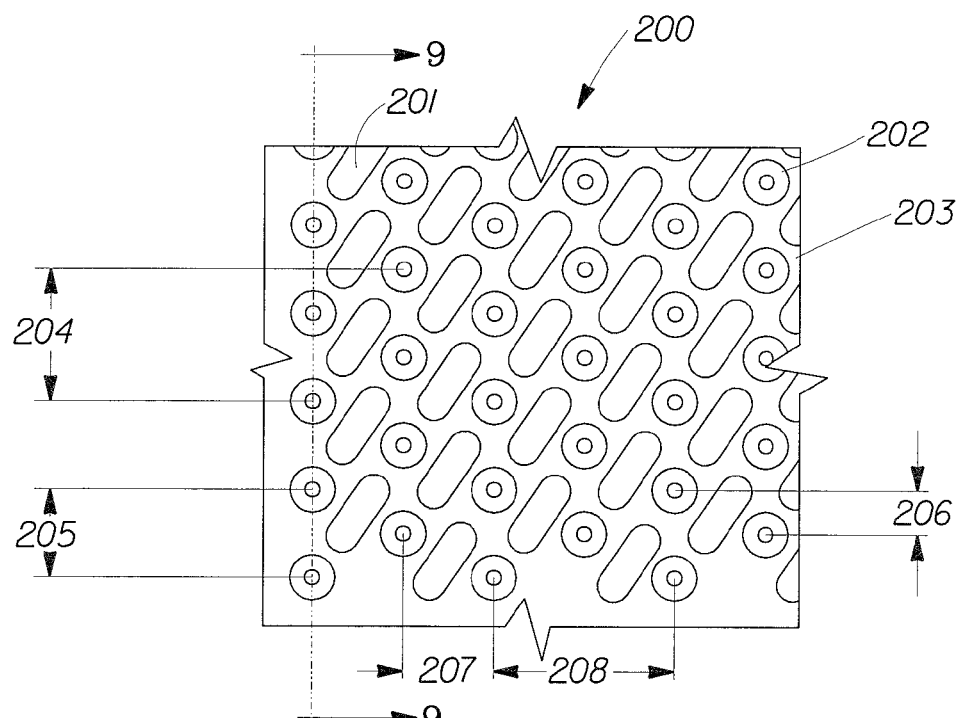
FIG. 8 is a top view of an embodiment of a flooring of an excrement sample collection area.
Figure 9:
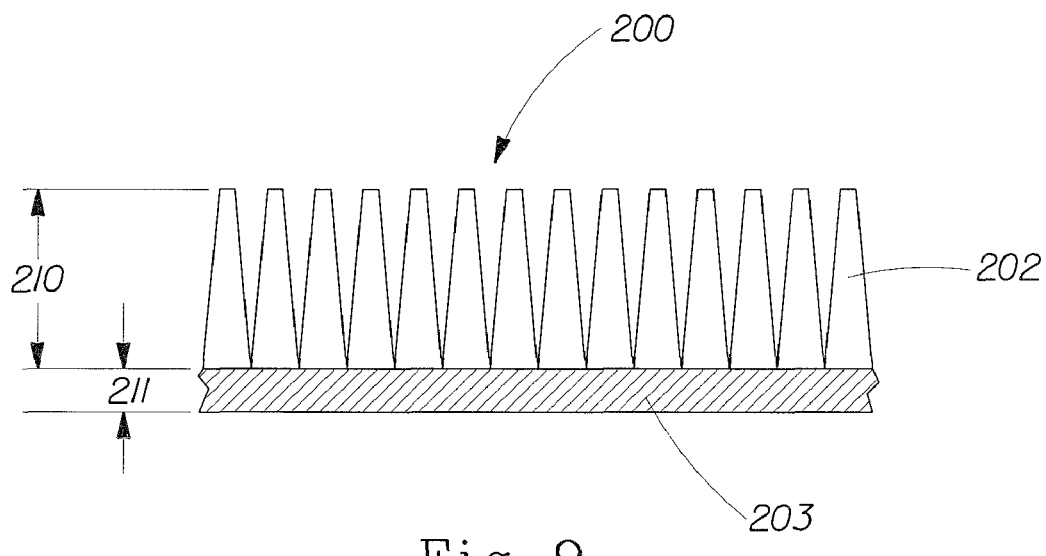
FIG. 9 is a cross section view of the flooring of FIG. 8 taken along line 9-9.

An animal deposits an excrement sample on the flooring of the excrement sample collection area. In an embodiment, the flooring is any material that does not mix with the excrement sample. In an embodiment, the flooring is any material that allows for removal of the excrement sample from the flooring of the excrement sample collection area. The flooring may comprise any material determined to be suitable by one of ordinary skill, including, but not limited to, concrete, marble, stone, wood, plastic, rubber, metal and combinations thereof. In an embodiment, the flooring may be flexible. In an embodiment, the flooring may be a molded plastic. In an embodiment, the flooring may be molded rubber. In an embodiment, the flooring may take on an appearance, including, but not limited to, the appearance of grass, rocks, litter, sand, dirt, clay. In an embodiment, the flooring may be any material that allows urine to pass through such as a fluid pervious or porous flooring. The pass through of the urine through the flooring may occur by means of gravity, vacuum, and combinations thereof. In an embodiment, the flooring may be a single piece of flooring or may comprise pieces that may be sized to fit and work together to form the flooring. Non-limiting examples of flooring may include boards, slats, tiles, mats, artificial turf, grates, screens and combinations thereof. FIG. 8 illustrates a top view of an embodiment of a flooring 200 of the excrement sample collection area. In such an embodiment, the flooring 200 comprises 55 durometer Neoprene molded into the shape and appearance of grass. The flooring 200 is fluid pervious and comprises holes 201, grass blades 202, and a support surface 203. The distance 204 between two grass blades may be from about 0.2, 0.25, or 0.3 in. to about 0.35 or 0.4 in. The distance 204 between two grass blades may be about 0.2, 0.25, 0.3, 0.35 and 0.4 in. The distance 205 between two grass blades may be from about 0.1, 0.15 or 0.2 in. to about 0.25 or 0.3 in. The distance 205 between two grass blades may be about 0.1, 0.15, 0.2, 0.25, and 0.3 in. The distance 206 between two grass blades may be from about 0.05, 0.75 or 0.1 in to about 0.15 or 0.2 in. The distance 206 between two grass blades may be about 0.05, 0.75, 0.1, 0.15 and 0.2 in. The distance 207 between two grass blades may be from about 0.1, 0.15 or 0.2 in. to about 0.25 or 0.3 in. The distance 207 between two grass blades may be about 0.1, 0.15, 0.2, 0.25, and 0.3 in. The distance 208 between two grass blades may be from about 0.3, 0.35, or 0.4 in to about 0.45 or 0.5 in. The distance 208 between two grass blades may be about 0.3, 0.35, 0.4, 0.45 and 0.5 in. FIG. 9 is a cross section view of the flooring 200 of FIG. 8 taken along line 9-9. The height 210 of a grass blade may be from about 0.2, 0.25, 0.3, 0.35 or 0.4 in. to about 0.45, 0.5, 0.55 or 0.6 in. The height 210 of a grass blade may be about 0.2, 0.25, 0.3, 0.35, 0.4, 0.45, 0.5, 0.55, and 0.6 in. The height 211 of the support surface 203 may be from about 0.05, 0.055, 0.06, 0.065, 0.07, 0.075 or 0.08 in to about 0.085, 0.09, 0.095, 0.1, 0.11, 0.12 or 0.13 in. The height 211 of the support surface 203 may be about 0.05, 0.055, 0.06, 0.065, 0.07, 0.075, 0.08, 0.085, 0.09, 0.095, 0.1, 0.11, 0.12 and 0.13 in.

The flooring may be subjected to weight measurements. Such weight measurements may provide a baseline weight of the flooring, may indicate the presence of an animal, may be part of a calculation of the weight of an excrement sample deposited thereon, and combinations thereof. The flooring may sit upon a single weigh scale or multiple weigh scales. In an embodiment comprising multiple weigh scales, the scales are placed in locations of even load, such as the four corners of a square or a rectangular flooring. The flooring may be shifted as needed to ensure proper placement on a weigh scale for accurate weight measurements. Such measurements may be taken continuously, periodically, and combinations thereof. In an embodiment, the automated collection system continuously records the weight of the flooring of the excrement sample collection area.

Figure 10:
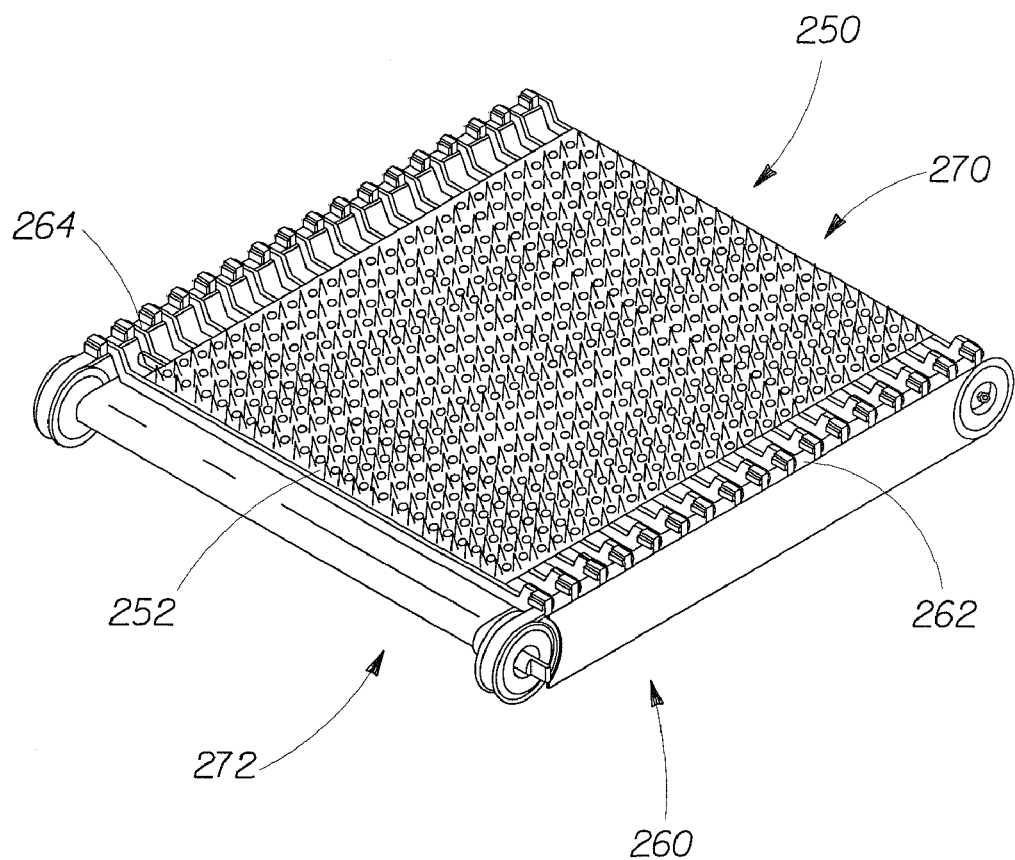
FIG. 10 illustrates a perspective view of a flooring positioned on a conveyor belt-like guide track.

The excrement sample deposited on the flooring of the excrement sample collection area may be collected and stored within the automated collection system. Collection of the excrement sample provides for the an excrement sample to be gathered into a single location. Collection of the excrement sample may occur by any method known to one of ordinary skill. Non-limiting examples of methods of collection of the excrement sample from the flooring include scraping the excrement sample from the flooring, squeegeeing the excrement sample from the flooring, pushing the excrement sample off of the flooring, draining the excrement sample through the flooring, tilting the flooring, rotating the flooring, vibrating the flooring, shaking the flooring, agitating the flooring, flipping the flooring, spinning the flooring, and combinations thereof. The method of collection may correlate to the type of flooring of the excrement sample collection area, the type of excrement sample being collected and combinations thereof. In an embodiment, the excrement sample comprises urine and is collected by draining through a porous flooring. In an embodiment, the excrement sample comprises urine and is collected by the tilting of a non-porous flooring. In such an embodiment, the tilting of the flooring may tilt the flooring around an axis, such as a horizontal axis. In an embodiment, the excrement sample comprises fecal matter which is collected by rotating the flooring. In such an embodiment the rotational movement is similar to the movement of a conveyor belt. For example, in such an embodiment, the flooring is suspended within the automated collection system on a conveyor belt-like guide track. FIG. 10 is an illustration of a flooring 250 positioned on the topside 270 of a conveyor belt-like guide track 260. The conveyor belt-like guide track 260 comprises two oval shaped tracks, 262 and 264, respectively, which are parallel to each other. The support base 252 of the flooring 250 may be attached to the oval shaped tracks, 262 and 264, by any manner determined to be suitable by one of ordinary skill such that the flooring 250 is able to move along the oval shaped tracks, 262 and 264. During rotation of the flooring 250, the flooring 250 turns over to the underside 272 of the conveyor belt-like guide track 260. The movement of the flooring may occur in a single direction or the direction may reverse. The movement may be continuous or discontinuous. The movement may occur any number of times as determined to be suitable by one of ordinary skill to collect the excrement sample from the flooring.

Excrement elimination event data is obtained regarding the weight and/or volume of the collected excrement sample. The weight and/or volume measurements are used to determine if the collected excrement sample will be stored within the automated collection system or if the collected excrement sample will be discarded as waste. In an embodiment, the excrement sample may be smaller than a predetermined minimum excrement sample volume and/or weight and can be discarded from the automated collection system. A predetermined minimum volume and/or weight may be programmed in the processing unit for the automated collection system. The volume of a urine excrement sample can be measured by methods including, but not limited to, liquid displacement, radar, and combinations thereof. The weight of a fecal excrement sample may be calculated as the difference between the flooring weight alone and a combination flooring plus fecal matter weight. The automated collection system may transmit a signal to the processing unit of the measured volume and/or weight of the excrement sample. The processing unit can compare the measured excrement volume and/or weight to the predetermined minimum volume and/or weight and transmit a signal to the automated collection system to either store or discard the excrement sample. A predetermined minimum excrement volume and/or weight may be any excrement volume and/or weight determined to be suitable by one of ordinary skill.

Excrement elimination event data obtained from a fresh excrement sample may provide more accurate excrement elimination event data than excrement elimination event data obtained from an excrement sample that has been in storage for a period of time. In an embodiment, a fresh excrement sample comprises fecal matter which has not dried out due to exposure to air and, therefore, an accurate weight and stool quality image may be obtained. In an embodiment, a fresh excrement sample comprises urine and an accurate volume measurement may be obtained prior to any evaporation of the excrement sample taking place. In an embodiment, excrement elimination event data may be obtained prior to the deposit of an excrement sample by an animal. In an embodiment, excrement elimination event data may be obtained as the excrement is being deposited by the animal. In an embodiment, excrement elimination event data may be obtained after the animal has exited the excrement sample collection area and prior to the collection of the excrement sample from the flooring of the excrement sample collection area. In an embodiment, excrement elimination event data may be obtained as the excrement sample is being collected from the flooring of the excrement sample collection area. In an embodiment, excrement elimination event data may be obtained while the excrement sample is in a data collection chamber. In such an embodiment, the excrement sample may be collected from the flooring of the excrement sample collection area and placed into the data collection chamber.

In an embodiment, the automated collection system is a urine collection system and excrement elimination event data may be obtained with regards to a urine sample for any technical parameter determined to be suitable by one of ordinary skill. Such technical parameters may include, but are not limited to, volume, osmolarity, the collection and characterization of crystals, ion content, pH, specific gravity, and combinations thereof. The excrement elimination event data may be obtained while the urine sample is in a data collection chamber. The urine may enter the data collection chamber following collection from the flooring of the excrement sample collection area. In an embodiment, the urine flows through the flooring of the excrement sample collection area into an area below the excrement sample collection area. The area below the excrement sample collection area may comprise a data collection chamber, a collection funnel, and combinations thereof. In an embodiment, the urine flows through the flooring of the excrement sample collection area into a collection funnel which may funnel the urine into a data collection chamber. In an embodiment, the volume of the urine sample may be measured by liquid displacement. In such a displacement method, the volume of the urine sample displaces an amount of liquid, such as water, and the amount of liquid displaced can be measured to provide the volume of the urine sample. In an embodiment, the volume of the urine sample is measured by a radar system. In such an embodiment, a radar beam may be projected from above the urine sample within the data collection chamber and into the urine sample. The volume measurement is calculated from the length of time needed for the radar beam to return to its starting position. In an embodiment, the pH of the urine sample may be measured by a pH probe. A sample of the urine is passed over the pH probe for a pH measurement of the urine sample. The sample amount may be any amount determined to be suitable by one of ordinary skill to provide an accurate pH measure of the urine sample. In an embodiment, the sample size may be from about 5, 10, 15, or 20 ml to about 75, 85, 95, 100, or 115 ml. The volume, pH, and other excrement elimination event data may be recorded in a data file associated with the automated collection system. The volume, pH and other excrement elimination event data may be recorded with each use of the automated collection system by an animal. The volume, pH and other excrement elimination event data may be recorded when the excrement sample is stored and when the excrement sample is discarded as waste.

In an embodiment, the automated collection system is a fecal collection system and the excrement elimination event data may be obtained with regards to the fecal matter for any technical parameter determined to be suitable by one of ordinary skill. Such technical parameters may include, but are not limited to, the weight of the sample, the image of the sample, the stool quality such as firmness and liquidity and combinations thereof. The weight of the fecal matter may be calculated by subtracting the last stable weight of the flooring of the excrement sample collection area before the animal entered the excrement sample collection area from the weight of the flooring following the use by and exit from the excrement sample collection area by the animal. The image of the fecal matter may be an electronic image such as a digital photograph. In an embodiment, the image may be obtained prior to the collection of the fecal sample from the flooring of the excrement sample collection area. The image of the fecal matter may be reviewed for stool quality such as firmness and liquidity. In an embodiment, the fecal matter may be classified as runny, loose, firm, or dry. The weight, image, stool quality, and other excrement elimination event data may be recorded in a data file associated with the automated collection system. The weight, image, stool quality, and other excrement elimination event data may be recorded with each use of the automated collection system. The weight, image stool quality, and other excrement elimination event data may be recorded when the excrement sample is stored and when the excrement sample is discarded as waste.

The excrement sample may be stored in a storage container. In an embodiment, the storage container is refrigerated. In an embodiment, the automated collection system may comprise at least one storage container. In an embodiment, the automated collection system comprises multiple storage containers. The storage containers may assist in the reduction or prevention of the growth of bacteria, the reduction or prevention of cross-contamination of excrement samples, the storage of multiple excrement samples from multiple animals, and combinations thereof. The excrement sample may be placed into a storage container from a data collection chamber or from the flooring of the excrement sample collection area. In an embodiment, urine may pass from a data collection chamber to a storage container. In an embodiment, fecal matter may transfer from the flooring of the excrement sample collection area to a storage container.

The automated collection system may comprise at least one storage container. In an embodiment, the automated collection system comprises at least two storage containers. The automated collection system may collect and store as many excrement samples as desired by one of ordinary skill. The automated collection system may collect and store as many excrement samples as may fit within the automated collection system. In such an embodiment, excrement samples collected after the automated collection system has reached capacity may be discarded as waste from the automated collection system. In an embodiment, the automated collection system comprises a carousel to hold the storage container(s). The carousel may rotate as needed to place successive excrement samples into a clean storage container. The rotation of the carousel may be horizontal, vertical, diagonally and combinations thereof. In an embodiment in which a carousel holds multiple storage containers, the storage containers may be provided with an identifier and may be arranged in any order determined to be suitable to one of ordinary skill, such as, but not limited to, numerical order, alphabetical order, bar code labels, symbols, and combinations thereof. The storage container identifier is utilized to correlate the excrement sample with the animal that provided the excrement sample. The identifier on the storage container may also allow for identifying the location of an excrement sample within the automated collection system. In an embodiment, the storage containers may be stored in the order in which they were filled with excrement samples.

The storage container may be any container determined to be suitable by one of ordinary skill. The storage container may include, but is not limited to, tubes, jars, boxes, vials, bags, and combinations thereof. The storage container may comprise a moveable lid. The storage container and moveable lid may comprise any material determined to be suitable by one of ordinary skill, such as, but not limited to, glass, plastic, metal, rubber, and combinations thereof. In an embodiment, the automated collection system is a urine collection system and the excrement samples are stored in vials. In such an embodiment the vials may comprise glass. In an embodiment, the automated collection system is a fecal collection system and the storage containers may be plastic boxes with moveable lids.

The automated collection system may comprise waste containers. The waste containers may store excrements samples that are not being retained. In an embodiment, a waste container in a urine collection system may hold waste feces. In an embodiment, the automated collection system may connect to a sewerline and waste excrement may pass from the automated collection system into the sewersystem.

Figure 11:
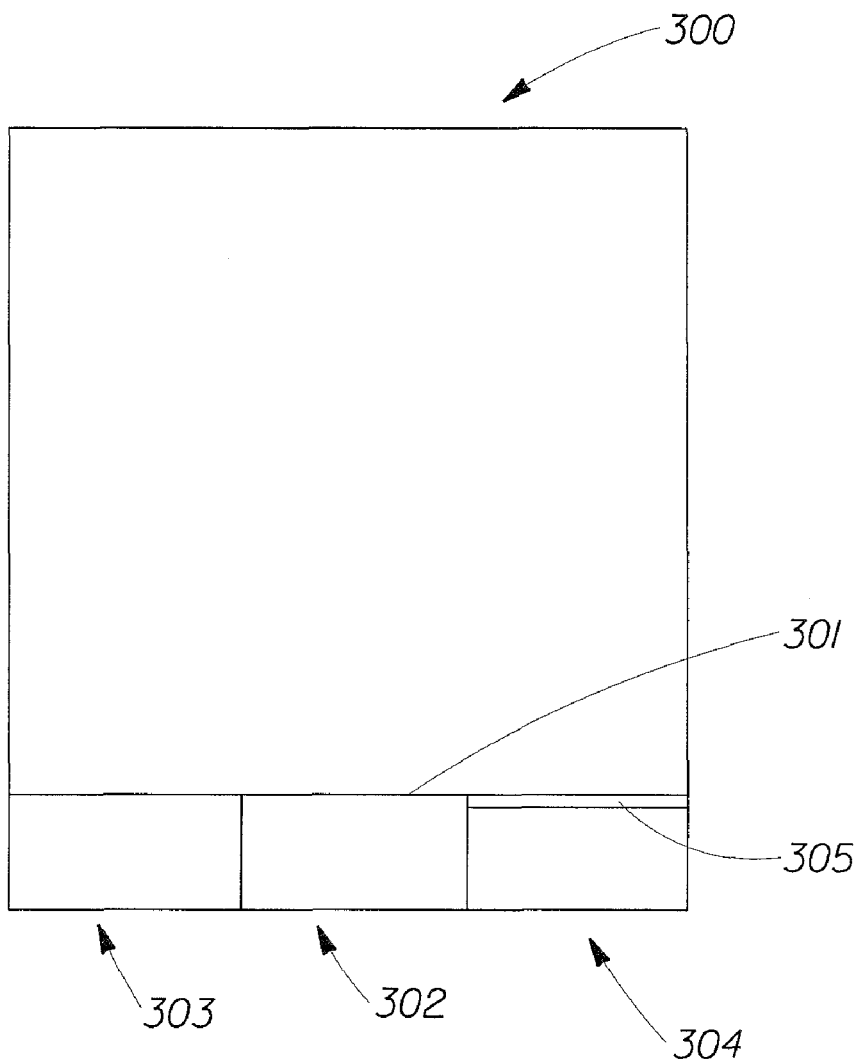
FIG. 11 illustrates a side view of an embodiment of an excrement sample collection area of a urine collection system.

In an embodiment, the automated collection system is a urine collection system. FIG. 11 illustrates a side view of an embodiment of an excrement sample collection area 300 of a urine collection system. The urine sample may transfer from the flooring 301 of the excrement sample collection area 300 to a data collection chamber 302 and excrement elimination event data regarding the urine sample may be obtained. The transfer of the urine sample to the data collection chamber may occur by any method such as gravity or vacuum transfer. The urine sample may then be stored in an individual storage container 303, such as a glass vial, for any additional data collection at a later time. The identification of the storage container may be recorded in a data file and correlated with the animal who deposited the urine sample. Any fecal matter residing on the flooring 301 of the excrement sample collection area 300 may be transferred to a waste container 304. The transfer of the fecal matter to the waste container 304 may occur by any method such as a rotation of the flooring 301. In an embodiment, the waste container 304 may be provided with a moveable lid 305. The moveable lid 305 may be positioned over the waste container 304 in a closed position until the collection of the fecal matter from the flooring 301. Such a position may prevent urine from entering the waste container 304. When the flooring 301 rotates, the moveable lid 305 of the waste container 304 may rotate into an open position to allow for the fecal matter to be placed into the waste container 304. The moveable lid 305 of the waste container 304 may rotate to a closed position after the fecal matter is placed into the waste container 304.

Figure 12:
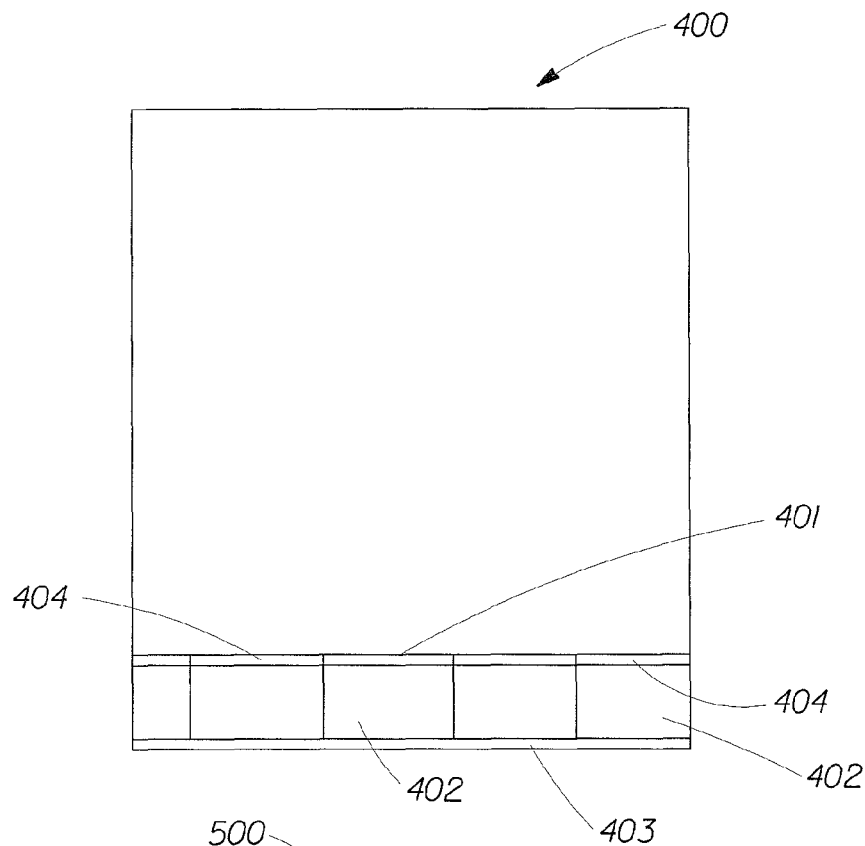
FIG. 12 illustrates a side view of an embodiment of an excrement sample collection area of a fecal collection system.

In an embodiment, the automated collection system is a fecal collection system. FIG. 12 illustrates a side view of an embodiment of an excrement sample collection area 400 of a fecal collection system. It may be desirable to store fecal samples comprising a weight that is greater than a predetermined minimum sample size. The flooring 401 of the excrement sample collection area 400 may undergo continuous weight measurements and the last stable weight measurement prior to the deposit of an excrement sample by an animal may be subtracted from the weight of the combination of the flooring and excrement sample such that the weight of the excrement sample may be calculated. In an embodiment, the minimum weight may be at least about 2 grams. Retained fecal samples may be stored within individual storage containers 402. The storage container 402 may be positioned on a carousel 403 which may rotate until a fresh storage container is moved into a position near the flooring 401 of the excrement sample collection area 400 for collection of the fecal matter. The transfer of the fecal matter to the storage container 402 may occur by any method such as a rotation of the flooring 401. In an embodiment, the storage container 402 may be provided with a moveable lid 404. The moveable lid 404 may be positioned over the storage container 402 in a closed position until the collection of the fecal matter from the flooring 401. Such a position may prevent urine from entering the storage container 402. When the flooring 401 rotates, the moveable lid 404 of the storage container 402 may rotate into an open position to allow for the fecal matter to be placed into the storage container 402. The moveable lid 404 of the storage container 402 may rotate to a closed position after the fecal matter is placed into the storage container 402. The identification of the storage container 402 may be recorded in the data file and correlated with the animal who deposited the excrement sample. Urine may pass through the flooring and into a sewerline for disposal.

The automated collection system may be a self-cleaning system. The automated collection system may perform a flush cycle following the exit of the animal from the excrement sample collection area. A flush cycle may clean the automated collection system, reduce and/or prevent cross-contamination between excrement samples, reduce and/or prevent the growth of bacteria in the automated collection system, and combinations thereof. The automated collection system may perform a flush cycle after an excrement sample has been collected, after an excrement sample has been collected but has been determined to be too small for storage, or after the animal has exited the automated collection system without depositing an excrement sample. The flooring, the excrement sample collection area, and combinations thereof may be flushed. The flush cycle may begin following the use of the automated collection system by an animal. The flush cycle may begin following a lapse of time after the animal has exited the automated collection system. The time lapse may allow for the collection of the excrement sample, a review of the excrement sample collection area to ensure the departure of the animal from the excrement sample collection area, and combinations thereof. In an embodiment, an unbroken infrared beam may verify the absence of an animal in the excrement sample collection area. The time lapse may be any length of time determined to be suitable by one of ordinary skill. In an embodiment, the time lapse may be at least about 15 seconds. A liquid, such as water, may be used to wash the flooring of the automated collection system. The liquid may be provided to the automated collection system in any manner determined to be suitable by one of ordinary skill, such as, but not limited to, hoses, spray nozzles, tubing, water jets, and combinations thereof. The flooring, once washed, may be air dried, blow dried, and combinations thereof. It is believed that a dry flooring may provide for a more animal friendly environment upon which to deposit an excrement sample. The flush cycle may be repeated as desired and may occur for any desirable period of time. In an embodiment, the flush cycle may comprise a duration of time from about 1, 2, 3, 4, or 5 minutes to about 6, 7, 8, 9, or 10 minutes. In an embodiment, the flush cycle may occur in the absence of an excrement deposit by an animal. In such an embodiment, the animal may have stepped onto the flooring of the excrement sample collection area and may have left the excrement sample collection area without depositing an excrement sample.

Figure 13:
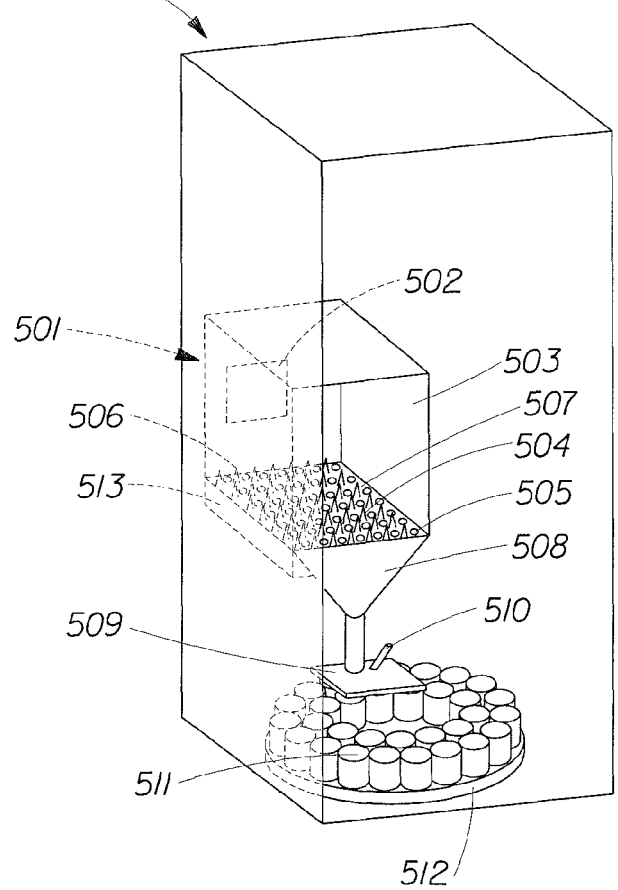
FIG. 13 illustrates the interior of an embodiment of a urine collection system.

In an embodiment, the automated collection system is a urine collection system comprising a collection system detection means, an excrement sample collection area, a data collection chamber and at least two storage containers. FIG. 13 illustrates the interior of an embodiment of such a urine collection system 500. The urine collection system 500 comprises an elevated excrement sample collection area 501. An elevated entrance 502 provides access to the excrement sample collection area 501. The excrement sample collection area 501 comprises walls such as side wall 503. The excrement sample collection area comprises a flooring 504. The flooring 504 comprises 55 durometer Neoprene molded into the shape and appearance of grass. The flooring 504 is fluid pervious and comprises holes 505, grass blades 506, and a support surface 507. The flooring 504 may be supported by a conveyer belt-like guide track system that allows the flooring to rotate during the collection of the fecal matter and during the flush cycle. Urine passes through the flooring 504 into a collection funnel 508 and into a data collection chamber 509. The data collection chamber comprises a pH probe 510. Following the obtainment of excrement elimination event data regarding the urine, the urine is transferred to a storage container, such as glass vial 511. Multiple storage containers are positioned on the carousel 512 for collection of urine samples. Waste fecal matter may be collected in the waste container 513.

In an embodiment, the automated collection system may comprise a landing zone located near the entrance to the excrement sample collection area. The landing zone may provide an animal with a place to sit or stand prior to entrance or upon exit from the automated collection system. The entrance of the automated collection system may include a tunnel, door, and combinations thereof. In an embodiment, an animal may enter a tunnel prior to passing through a door and entering an excrement sample collection area. The door may move in any direction to allow passage.

The door and/or the automated collection system may be provided with a sensor that may record the angle of movement of the door. A door movement angle greater than a predetermined angle may indicate the entrance of an animal into the excrement sample collection area. A door movement angle smaller than a predetermined angle may indicate that an animal has partially entered the excrement sample collection area and/or may have backed away from the excrement sample collection area.

In an embodiment, the door may be locked into a closed position following the entrance of an animal into the excrement sample collection area. The closed and locked door may prevent another animal from entering the excrement sample collection area while the first animal is present in the excrement sample collection area. The animal within the excrement sample collection area may be able to exit the excrement sample collection area at will by moving the door outward and away from the excrement sample collection area.

Figure 14:
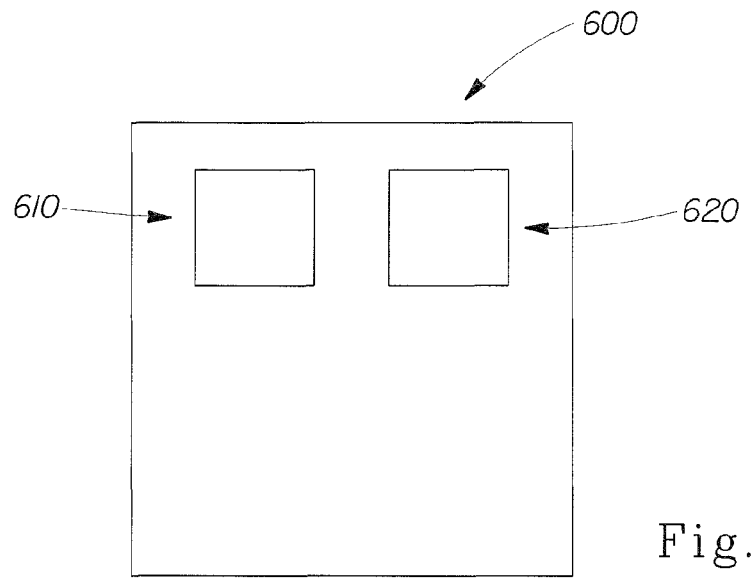
FIG. 14 illustrates a schematic plan view of a primary enclosure comprising an automated collection system and an automated feeding station.

In one embodiment, the primary enclosure comprises at least one automated feeding station. FIG. 14 illustrates a primary enclosure 600 comprising an automated collection system 610 and an automated feeding station 620. In an embodiment, the primary enclosure comprises a urine collection system and an automated feeding station. In an embodiment, the primary enclosure comprises a fecal collection system and an automated feeding station. In an embodiment, the primary enclosure comprises a combination urine/fecal collection system and an automated feeding station.

The automated feeding station comprises a feeding station detection means for detecting an animal and at least one feeding area. The feeding station detection means for detecting the animal may be placed in, on, or near the automated feeding station. The feeding station detection means detects the identifier of the animal. The detection occurs by any method that complements the animal's identifier, such as, but not limited to, visual recognition, weight sensor, bar code reader, infrared sensor, RF sensor, ultrasonic sensor, and combinations thereof. In an embodiment, the feeding station detection means comprises an RF sensor and complements the animal's RFID chip. In an embodiment, the feeding station detection means comprises an ultrasonic sensor and complements the animal's ultrasonic emissions. In an embodiment, the feeding station detection means comprises a visual recognition detector and can detect the animal through visual pattern recognition of hair patterns or hair coloration. Detection of the animal's identifier provides the automated feeding station with the identity of the animal which can be recorded in a data file. The time the identifier is detected, the time the animal enters the automated feeding station, the time the animal exits the automated feeding station, and combinations thereof may also be recorded in a data file. In an embodiment, the feeding station detection means is located within the automated feeding station. In an embodiment, the feeding station detection means is located within the entrance to the automated feeding station. In an embodiment, the automated feeding station comprises a door to the feeding area and the feeding station detection means may be located on the door. In an embodiment, the automated feeding station may comprise a top surface, such as a roof, and the feeding station detection means may be located on the roof.

Figure 15:
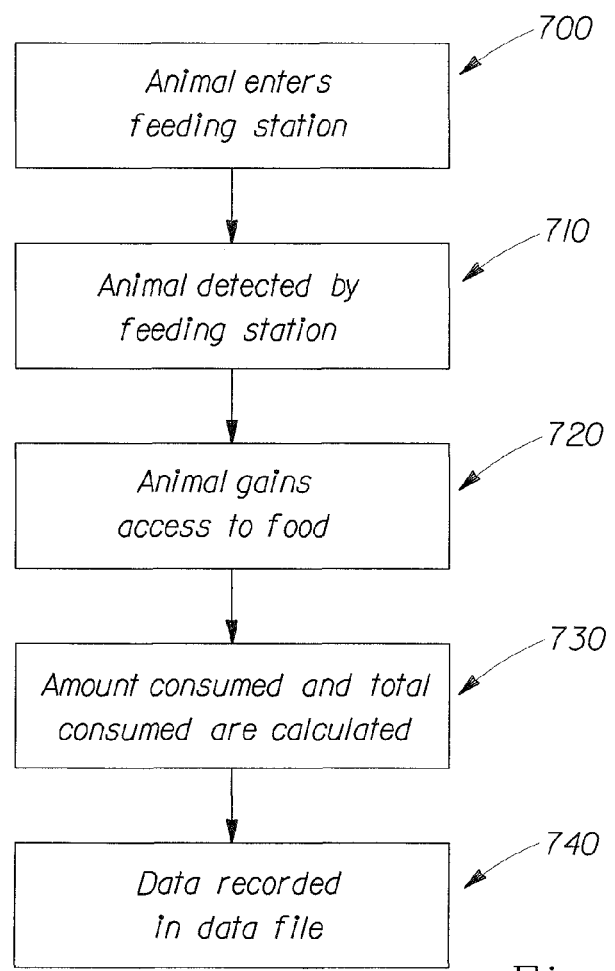
FIG. 15 illustrates a flow diagram of an embodiment of the methods of using an automated feeding station.

FIG. 15 illustrates a flow diagram of an embodiment of the method of use of an automated feeding station. The steps may be illustrated as follows: Step 1, 700, an animal enters the automated feeding station, Step 2, 710, the animal is detected by the automated feeding station, Step 3, 720, the animal gains access to a food container for a feeding event, Step 4, 730, the amount of food consumed in the feeding event and total amount of food consumed in a given time period are calculated, Step 5, 740, the feeding event data is recorded in a data file. It should be recognized that the order listed and illustrated in a non-limiting order. An animal may voluntarily enter and exit the automated feeding station. The voluntariness on the part of the animal allows for the animal to follow a natural routine and habit. It is believed that the voluntariness may reduce and/or prevent stress to the animal.

Figure 16:
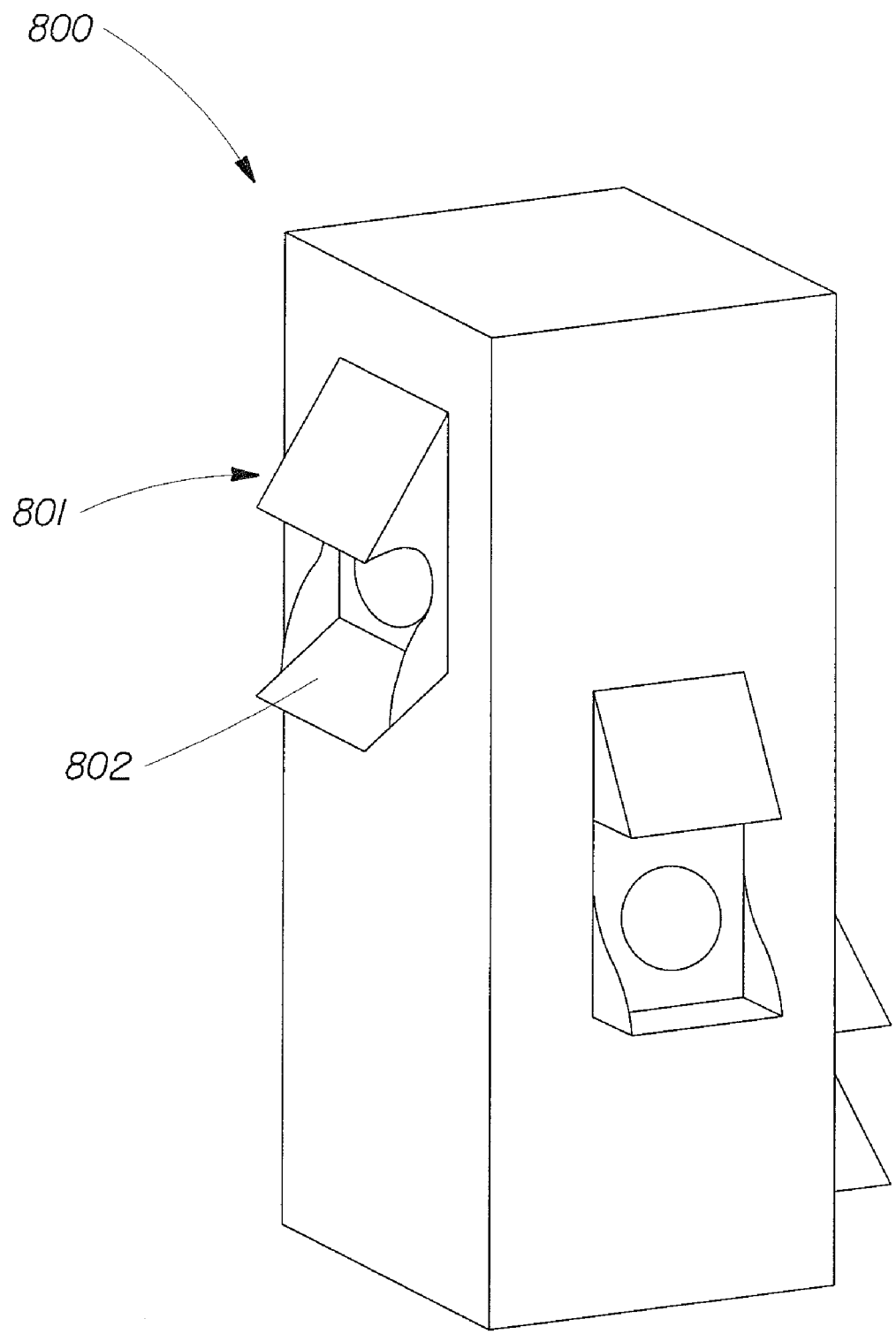
FIG. 16 is a perspective view of an embodiment of an automated feeding station.

The automated feeding station comprises at least one feeding area. FIG. 16 illustrates a perspective view of the front of an embodiment of an automated feeding station 800. The automated feeding station 800 comprises at least one feeding area 801. Each feeding area 801 may comprise a landing zone 802 upon which the animal may sit or stand. In an embodiment, the automated feeding station 800 may comprise at least two feeding areas. In an embodiment, the automated feeding station 800 may comprise at least three feeding areas. In an embodiment, the automated feeding station 800 may comprise more than three feeding areas. An animal may reach a feeding area 801 by walking directly to it, by stairs, ramps, lifts, jumping, and combinations thereof. In an embodiment, feeding events may occur at each feeding area simultaneously.

In an embodiment, the automated feeding station comprises more than one feeding area and an animal may be assigned to a particular feeding area of the automated feeding station. In such an embodiment, an animal may gain access to their assigned food container in the assigned feeding area. To assign an animal to a feeding area, the animal may be monitored to determine if there is a preference for which feeding area of the automated feeding station in which the animal's food container is placed (i.e., by monitoring if the animal continually selects a particular feeding area over all available feeding areas). It is believed that the feeding area preference may also be affected by any natural social hierarchy that may exist among the animals in a primary enclosure comprising multiple animals in a group housing environment. If a determination is made that an animal has a preference for a particular feeding area of the automated feeding station, the animal's food container may be placed at that feeding area and the animal assigned to consume food at that feeding area of the automated feeding station.

The animal may be prevented from gaining access to a non-assigned feeding area by any manner known to one of ordinary skill, such as, but not limited to, doors, divider walls, lids, walls, covers, and combinations thereof. The automated feeding station detects an animal, determines if the animal may eat, and presents the animal's food to the animal if the automated feeding station has determined that the animal may eat. The determination of whether the animal may eat may be performed by the following method: 1) the automated feeding station sends a signal to the processing unit as to which animal it detects and the feeding area at which the animal is detected, 2) the processing unit researches the data files to determine the assigned feeding area for the animal, the predetermined total amount of food that the animal may consume in a given time period, and whether the animal has any food remaining to eat, and 3) the processing unit sends a signal to the automated feeding station to allow the animal access to a food container if the animal is at its assigned feeding area and if the animal has food remaining in its food container. If the animal is at a non-assigned feeding area or if the animal has consumed the allotted amount of food, the animal is denied access to the feeding area.

A feeding area comprises a feeding alcove, a food nest, and at least one food container within the food nest. The feeding alcove is an area of the automated feeding station within which a food container may be presented to an animal in order for the animal to consume the food contents of the food container. A feeding alcove may be any size as determined to be suitable by one of ordinary skill in the art to provide space for an animal to consume food that has been presented to the animal. A food nest comprises at least one food container. In an embodiment, a food nest comprises at least two food containers. In an embodiment, a food nest comprises at least 3, 4, or 5 food containers. In an embodiment, a food nest comprises more than 5 food containers. An animal may be assigned to a food container. In an embodiment, an animal may be assigned to a food container, a food nest and a feeding area of an automated feeding station. In an embodiment, a feeding area comprises a food nest wherein the food nest comprises multiple food containers wherein each food container is individually assigned to an animal within the primary enclosure. In such an embodiment, each animal is assigned to a single food container. In such an embodiment, the food nest comprises the food containers which have been assigned to multiple animals and each of those animals has been assigned to the same feeding area of the automated feeding station.

Food for an animal to consume is located within an assigned food container. The food may be contained in any container determined to be suitable by one of ordinary skill including, but not limited to, bowls, bags, troughs, plates, tubs, and combinations thereof. The food container and the food may be weighed on a weigh scale prior to a feeding event and again following the feeding event. When weighing the food container, the food container may be shifted back and forth over a weigh scale to ensure that the food container is sitting squarely on the weigh scale. The automated feeding station may record the weight of the food container and contents prior to the feeding event and the weight of the food container and contents following the feeding event.

The automated feeding station may detect an animal, present a food container to the animal, and record feeding event data. Non-limiting examples of feeding event data includes, the identity of the animal, the date of the feeding event, the total amount of food available for consumption by the animal in a given time period, the type of diet, the initial weight of the food container and contents, the time of the feeding event, the end weight of the food container and contents, the amount of food consumed in an individual feeding event and the total amount of food consumed within a given time period, the assigned feeding area, the assigned food container, an experiment code, the time the animal enters the automated feeding station, the time the animal exits the automated feeding station, and combinations thereof. The "amount of food consumed" can be determined by the difference in the initial weight of the food container and contents when the animal enters the automated feeding station and the end weight of the food container and contents when the animal exits the automated feeding station. The "total amount of food consumed" can be determined by the difference in the first initial weight of the food container and contents at the beginning of a given time period and the most recent weight of the food container and contents.

Figure 17:
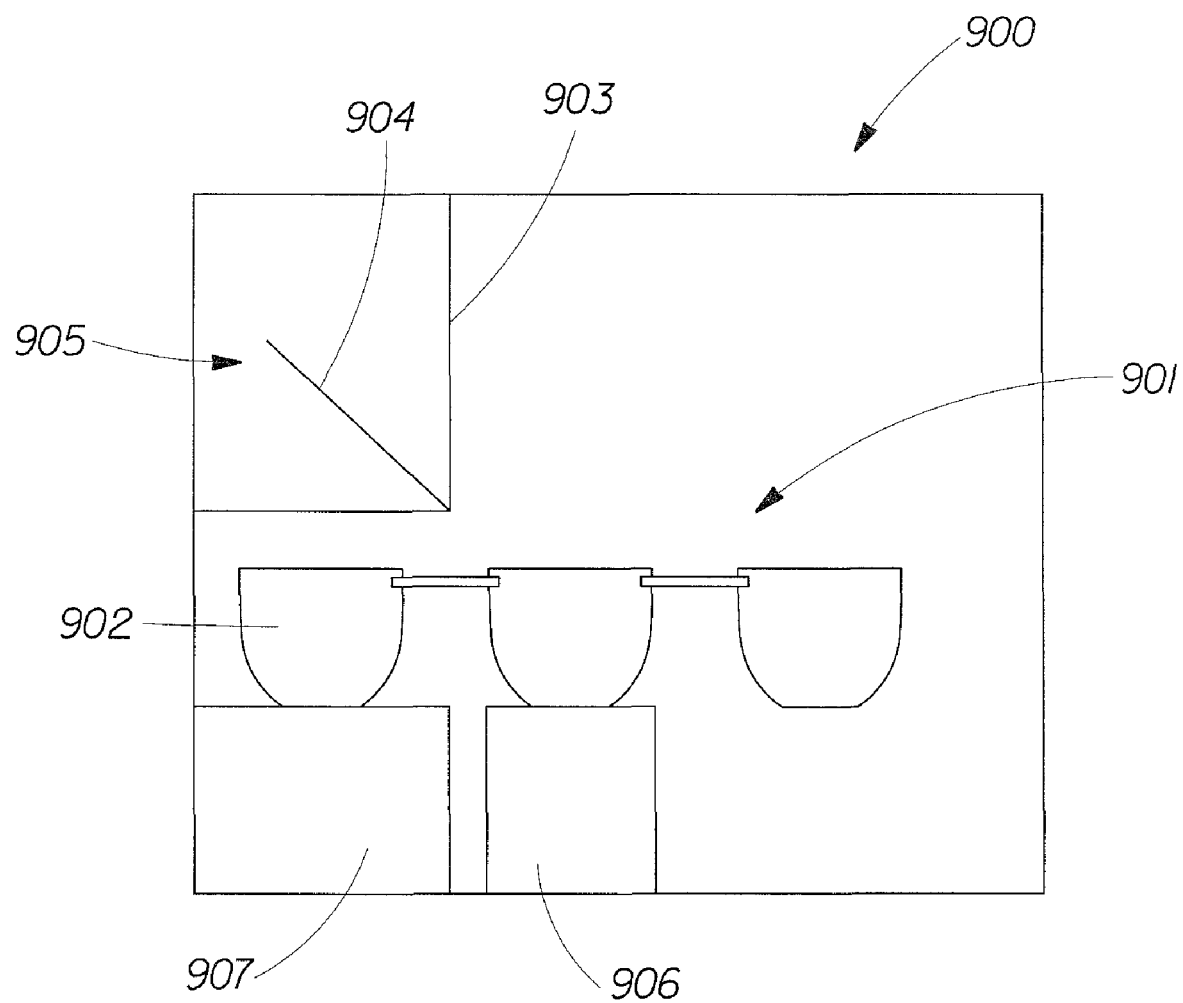
FIG. 17 is a side view of the interior of an embodiment of an automated feeding station.

FIG. 17 illustrates a side view of an embodiment of a feeding area 900. Each feeding area 900 comprises a feeding alcove 905 and at least one food nest 901. Each food nest 901 comprises at least one food container 902. In an embodiment, the feeding alcove 905 may comprise a perimeter defined by divider panels 903. The divider panels 903 may comprise a feeding door 904. The feeding door 904 may remain in the closed position until an animal has been detected at the feeding area 900 and has been given access to its assigned food container 902. The feeding door 904 may open thereby allowing the animal to have access to the food contents within its assigned food container 902. The food nest 901 may be located behind the divider panels 903 such that the animal may not interact with the entire food nest 901 and thereby preventing the animal from consuming the food contents of other food containers 902 within the food nest 901. In an embodiment in which the food nest 901 comprises multiple food containers 902, the food containers 902 may be arranged in any manner within the food nest 901. After the animal is allowed entry into the feeding area 900, the animal's assigned food container 902 within the food nest 901 may be placed into close proximity with the feeding alcove 905 to provide the animal with access to its assigned food container 902. Such placement of the food container 902 may occur by any means known to one of ordinary skill in the art, including, for example, rotation of the food nest 901 until the assigned food container 902 is aligned with the feeding alcove 905. In an embodiment, a carousel 906 may be provided for the rotation of the food nest 901. A scale 907 may be located within the feeding area 900. The food container 902 may be placed on the scale 907 and the weight of the food container 902 and contents may be measured. The divider panels 903 may comprise a feeding door 904. After the weight of the food container 902 and contents is measured, the feeding door 904 may be opened providing the animal with access to the food container 902. When the feeding door 904 is in an open position the animal may have access to its food container 902. When the feeding door 904 is in a closed position, the animal is prevented from accessing its food container 902.

In an embodiment, the feeding area 900 may comprise infrared beams. In such an embodiment, the feeding door 904 may remain open for the length of time that the infrared beams are broken due to the presence of the animal. In an embodiment, the feeding door 904 may remain open for the length of time that there is only one animal located within the feeding area 900. In the event that a second animal is detected at an already occupied feeding area the feeding door 904 may close. The feeding door 904 may also close when the animal has finished eating. The feeding station may record the time at which the feeding door 904 opens and the time at which the feeding door 904 closes.

A primary enclosure may comprise an indoor space, an outdoor space, and combinations thereof. An animal within the primary enclosure may have free movement between the indoor space and the outdoor space. The primary enclosure may comprise enrichment for the animals. The enrichment may include a variety of novel and interactive activities for the animals. The enrichment may comprise wall mounts, floor tools, pools of water, windows, music, television, toys, bedding, hiding locations, hay, gaits, hutches, shade areas, mulch, shavings, and combinations thereof. The surfaces of the enrichment may engage the senses of the animals such as the senses of sight, sound, smell, touch and taste. The wall mounts may be interchangeable in their location on the walls. The surfaces of the wall mounts may comprise fleece, plastic, and combinations thereof. The wall mounts may be a flat surface, may form a tunnel or may provide a hammock. The windows may comprise windows between the indoor space and the outdoor space, windows between the indoor space and an outdoor area separate from the outdoor space, windows between separate primary enclosures, and combinations thereof. The windows may allow natural light to enter the primary enclosure.

Systematic approaches may be utilized to acclimate the animals living in the primary enclosure to the use of the automated collection system and to promote acceptance by the animals of the use of the automated collection system. The training may take on any method known to one of ordinary skill in the art. The training may correspond to the complexity of the automated collection system. These approaches may acclimate an animal to the flooring of an excrement sample collection area, changes in elevation of an excrement sample collection area, space within an automated collection system such as an excrement sample collection area, and combinations thereof. These approaches may also acclimate an animal to the ultimate location of an excrement sample collection area within an automated collection system. In an embodiment, a method of acclimating an animal to utilize an automated collection system comprises the steps of locating an excrement sample collection area on or near the floor of the primary enclosure and periodically elevating the excrement sample collection area until it reaches the desired height in elevation. In an embodiment, the method of acclimating an animal to the excrement sample collection area includes modifying the configuration of the excrement sample collection area. The excrement sample collection area may initially be the flooring which may then undergo modifications to further include a perimeter, walls, a ceiling, a tunnel entrance, and combinations thereof. In an embodiment, the method of acclimating an animal to utilize an automated collection system may further comprise the step of enclosing the excrement sample collection area within a perimeter such as may be encountered in the automated collection system. In an embodiment, the perimeter comprises walls. In an embodiment, the perimeter comprises walls and a ceiling. In an embodiment, the method of acclimating an animal to utilize an automated collection system may further comprise adding a tunnel entrance to the excrement sample collection area through which the animal traverses to gain access to the excrement sample collection area.

An animal may be placed in, around, on and near the flooring and the excrement sample collection area in its various elevations and configurations. The animal may be observed for interaction with the flooring and the excrement sample collection area. Increased interation with the various embodiments of flooring heights and excrement sample collection area configurations is an indicator of increasing acclimation to the flooring heights and excrement sample collection area configurations. In an embodiment, the method of acclimating an animal to utilize an automated collection system may comprise the following steps: 1) locating the flooring of the excrement sample collection area on the floor of the primary enclosure and observing the animal for increasing interaction with the flooring; 2) placing the flooring of the excrement sample collection area in a container such as an empty tray and observing the animal for increasing interaction with the flooring; 3) elevating the flooring of the excrement sample collection area in the tray above the floor of the primary enclosure and observing the animal for increasing interaction with the flooring; 4) enclosing the flooring of the excrement sample collection area such as by enclosing the flooring within a single animal cage environment and observing the animal for increasing interaction with flooring; 5) locating the flooring of the excrement sample collection area external to the primary enclosure within an enclosed environment and providing access to the flooring through an opening in a wall of the primary enclosure and observing the animal for increasing interaction with the flooring; 6) connecting a tunnel between the single cage environment and the opening in the wall of the primary enclosure providing passage for an animal to move between the primary enclosure and the single cage environment and observing the animal for increasing interaction with the flooring.

Example

Comparison Between Automated Collection System and Cystocentesis

Two experiments are conducted to compare cat urine pH obtained from an automated collection system with cat urine pH obtained from cystocentesis.

Experiment 1

Eight cats are maintained in a group-housed primary enclosure and each cat is fed a control diet of Iams Original Cat with Chicken (reduced fat, increased protein) diet ("Control"). Each cat is fed 60 grams of food per day (50% of their daily food allotment at 7:00 AM and 50% of the daily food allotment at 3:00 PM). All cats are fed utilizing an automated feeding station. This is done by filling the food containers in the automatic feeding station with 50% of the diet in the morning and 50% of the diet in the afternoon. The cats are provided with twenty-four hour access to an assigned food container which has been filled with a predetermined amount of food. Food consumption and time of feeding events are recorded.

Cats are kept on the Control diet for a time period of four weeks. All cats are able to follow normal habits and routines for food consumption and excrement elimination during this four week time period. During the four week time period, urine samples are collected via an automated urine collection system and excrement elimination event data, including urine pH and urine volume, is obtained. Volume measurements are obtained in a data collection chamber within the automated urine collection system using the radar method. The pH is measured in the data collection chamber and the pH is measured using a Sentron pH meter Type Titan X with a Sentron Hot line probe.

During week 5, urine samples are collected via the automated urine collection system as well as via cystocentesis. The method of collection of the urine pH and urine volume during week 5 is as follows:

All cats are maintained on the feeding regimen of receiving 60 grams of food per day (50% of the daily food allotment at 7:00 AM and 50% of the daily food allotment at 3:00 PM). On the day of urine collection via the automated urine collection system the cats are group-housed in the primary enclosure and fasted overnight the night prior to the day of urine collection. One the day of urine collection, the morning allotment of food is withheld from the animals. If an animal does not deposit a urine sample prior to Noon, the animal is fed their morning allotment of food, repeats the two meal protocol the next day, and repeats the attempt at collecting a urine sample via the automated urine collection system the day after repeating the two meal protocol. If an animal deposits more than one urine sample prior to Noon, the urine pH and urine volume utilized in the comparison with the urine pH obtained via cystocentesis is the urine pH and urine volume from the first urine sample to be greater than 2 mls in volume. The urine pH obtained via the automated urine collection system is also verified within 15 minutes of deposit utilizing an Orion 3 star pH portable with an Orion thermal Tiode low multi probe (9107BNMD).

The day prior to urine collection via cystocentesis, cats are fed 50% of their daily food allotment at 7:00 AM and 50% of their daily food allotment at 3:00 PM. This is done by filling the food containers in the automatic feeding station with 50% of the diet in the morning and 50% of the diet in the afternoon. At 5:00 PM the night before the cystocentesis procedure is performed, cats are placed in individual cages without a litter box or food access. Cystocentesis samples are collected beginning at 7:00 AM. If it is not possible to obtain a urine sample from an individual cat, the cat is returned to group housing for the remainder of the day, the two meal protocol is repeated and the cat is returned to an individual cage the following night and the cystocentesis procedure is attempted at 7:00 AM the following morning.

The pH of the urine samples obtained via cystocentesis is obtained using an Orion 3 star pH portable with an Orion thermal Tiode low multi probe (9107BNMD).

The cystocentesis method is as follows:

Equipment Needed:

Sterile 1 to 1.5 inch, 20 to 22 gauge regular or Vacutainer® needles

A sterile 6 or 12 ml syringe and needle

A Vacutainer® with needle and a 7 ml Vacutainer® tube

Clippers

Isopropyl alcohol

Method of Collection

The position of the animal may vary with the technique and the person performing the cystocentesis. The animal may be in lateral or dorsal recumbency, or in a standing position.

The cystocentesis may be performed blind, by palpation, or with ultrasound guidance.

If the sample might be used for bacterial culture, the site of the cystocentesis should be clipped and wiped with isopropyl alcohol.

The needle should be cleanly advanced through the skin and into the urinary bladder. If the bladder is not entered the needle should be withdrawn to just under the skin and redirected. The angle of the needle should not be changed while it is deep in the abdomen or organ injury may occur.

Once the sample is obtained, negative pressure should be released by removing the tube or releasing pressure on the syringe before withdrawing the needle completely.

If a syringe and needle were used, the sample should be transferred to an appropriate container.

At the start of week 6, all cats are switched to a diet of Eukanuba Veterinary Diet Mod pH/O ("Test"). Each cat is fed 60 grams of food per day (30 grams of food twice a day). All cats are kept on this diet for a time period of four weeks. During the four week time period, urine samples are collected via an automated urine collection system and excrement elimination event data, including urine pH and urine volume, is obtained.

During week 10, urine samples are collected via the automated urine collection system as well as via cystocentesis. The method of collection of the urine pH and urine volume during week 10 is as described above.

At the start of week 11, all cats are maintained on the Test diet and are maintained on the Test diet for four weeks. During the four week time period, urine samples are collected via an automated urine collection system and excrement elimination event data, including urine pH and urine volume, is obtained.

During week 15, urine samples are collected via the automated urine collection system as well as via cystocentesis. The method of collection of the urine pH and urine volume during week 15 is as described above.

During the collection of urine samples via the automated collection system and via cystocentesis during weeks 5, 10 and 15, if a cat undergoes collection on Day 1 of week 5, the cat will undergo collection on Day 1 of weeks 10 and 15; if a cat undergoes collection on Day 2 of week 5, the cat will undergo collection on Day 2 of weeks 10 and 15; and so on.

Table 1 is a comparison of the urine pH of samples collected via the automated urine collection system and via cystocentesis:

TABLE 1

| Cat Identity | Diet | Week | Urine pH Urine Collection System | Urine pH Cystocentesis |
|---|---|---|---|---|
| Cat #1 | Control | 5 | 6.4 | 5.9 |
|  | Test | 10 | 7.2 | 7.1 |
|  | Test | 15 | 6.8 | 6.9 |
| Cat #2 | Control | 5 | 6.5 | 6.5 |
|  | Test | 10 | 7.3 | 7.1 |
|  | Test | 15 | 6.9 | 7.2 |
| Cat #3 | Control | 5 | 6.5 | 6.5 |
|  | Test | 10 | 7.4 | 7.5 |
|  | Test | 15 | 7.2 | 7.1 |
| Cat #4 | Control | 5 | 6.1 | 6.3 |
|  | Test | 10 | 7.1 | 7.1 |
|  | Test | 15 | 6.7 | 7 |
| Cat #5 | Control | 5 | 6.2 | 5.8 |
|  | Test | 10 | 7.1 | 6.8 |
|  | Test | 15 | 6.7 | 6.8 |
| Cat #6 | Control | 5 | 6.2 | 6 |
|  | Test | 10 | 7.3 | 7.1 |
|  | Test | 15 | 6.8 | 6.9 |
| Cat #7 | Control | 5 | 6 | 6.1 |
|  | Test | 10 | 7.2 | 7.2 |
|  | Test | 15 | 6.8 | 6.8 |
| Cat #8 | Control | 5 | 6.7 | 6.5 |
|  | Test | 10 | 7.1 | 6.5 |
|  | Test | 15 | 6.9 | 7 |

Experiment 2

Twelve cats are maintained in a group-housed primary enclosure. Six cats are fed a control diet of Iams Original Cat with Chicken (reduced fat, increased protein) diet ("Control"). Six cats are fed a diet of Eukanuba Veterinary Diet Mod pH/O ("Test"). Each cat is fed 60 grams of food per day (50% of their daily food allotment at 7:00 AM and 50% of the daily food allotment at 3:00 PM). All cats are fed utilizing an automated feeding station. This is done by filling the food containers in the automatic feeding station with 50% of the diet in the morning and 50% of the diet in the afternoon. The cats are provided with twenty-four hour access to an assigned food container which has been filled with a predetermined amount of food. Food consumption and time of feeding events are recorded.

Cats are maintained on the Control diet and Test diet, respectively, for a time period of four weeks. All cats are able to follow normal habits and routines for food consumption and excrement elimination during this four week time period. During the four week time period, urine samples are collected via an automated urine collection system and excrement elimination event data, including urine pH and urine volume, is obtained. Volume measurements are obtained in a data collection chamber within the automated urine collection system using the radar method. The pH is measured in the data collection chamber and the pH is measured using a Sentron pH meter Type Titan X with a Sentron Hot line probe.

During week 5, urine samples are collected via the automated urine collection system as well as via cystocentesis. The method of collection of the urine pH and urine volume during week 5 is as follows:

All cats are maintained on the feeding regimen of receiving 60 grams of food per day (50% of the daily food allotment at 7:00 AM and 50% of the daily food allotment at 3:00 PM). On the day of urine collection via the automated urine collection system the cats are group-housed in the primary enclosure and fasted overnight the night prior to the day of urine collection. On the morning of the urine collection, the morning allotment of food is withheld from the animals. If an animal does not deposit a urine sample prior to Noon, the animal is fed their morning allotment of food, repeats the two meal protocol the next day, and repeats the attempt at collecting a urine sample via the automated urine collection system the day after repeating the two meal protocol. If an animal deposits more than one urine sample prior to Noon, the urine pH and urine volume utilized in the comparison with the urine pH obtained via cystocentesis is the urine pH and urine volume from the first urine sample to be greater than 2 mls in volume. The urine pH obtained via the automated urine collection system is also verified within 15 minutes of deposit utilizing an Orion 3 star pH portable with an Orion thermal Tiode low multi probe (9107BNMD).

The day prior to urine collection via cystocentesis, cats are fed 50% of their daily food allotment at 7:00 AM and 50% of their daily food allotment at 3:00 PM. This is done by filling the food containers in the automatic feeding station with 50% of the diet in the morning and 50% of the diet in the afternoon. At 5:00 PM the night before the cystocentesis procedure is performed, cats are placed in individual cages without a litter box or food access. Cystocentesis samples are collected beginning at 7:00 AM. If it is not possible to obtain a urine sample from an individual cat, the cat is returned to group housing for the remainder of the day, the two meal protocol is repeated and the cat is returned to an individual cage the following night and the cystocentesis procedure is attempted at 7:00 AM the following morning.

The pH of the urine samples obtained via cystocentesis is obtained using an Orion 3 star pH portable with an Orion thermal Tiode low multi probe (9107BNMD).

The cystocentesis method is as follows:
Equipment Needed:
Sterile 1 to 1.5 inch, 20 to 22 gauge regular or Vacutainer® needles
A sterile 6 or 12 ml syringe and needle
A Vacutainer® with needle and a 7 ml Vacutainer® tube
Clippers
Isopropyl alcohol
Method of Collection
The position of the animal may vary with the technique and the person performing the cystocentesis. The animal may be in lateral or dorsal recumbency, or in a standing position.
The cystocentesis may be performed blind, by palpation, or with ultrasound guidance.
If the sample might be used for bacterial culture, the site of the cystocentesis should be clipped and wiped with isopropyl alcohol.
The needle should be cleanly advanced through the skin and into the urinary bladder. If the bladder is not entered the needle should be withdrawn to just under the skin and redirected. The angle of the needle should not be changed while it is deep in the abdomen or organ injury may occur.
Once the sample is obtained, negative pressure should be released by removing the tube or releasing pressure on the syringe before withdrawing the needle completely.
If a syringe and needle were used, the sample should be transferred to an appropriate container.

At the start of week 6, all cats are switched to a new diet. The cats initially fed the Control diet are switched to the Test diet. The cats initially fed the Test diet are switched to the Control diet. Each cat is fed 60 grams of food per day (30 grams of food twice a day). All cats are kept on this diet for a time period of four weeks. During the four week time period, urine samples are collected via an automated urine collection system and excrement elimination event data, including urine pH and urine volume, is obtained.

During week 10, urine samples are collected via the automated urine collection system as well as via cystocentesis. The method of collection of the urine pH and urine volume during week 10 is as described above.

At the start of week 11, all cats are maintained on their respective diet and are maintained on their respective diet for four weeks. During the four week time period, urine samples are collected via an automated urine collection system and excrement elimination event data, including urine pH and urine volume, is obtained.

During week 15, urine samples are collected via the automated urine collection system as well as via cystocentesis. The method of collection of the urine pH and urine volume during week 15 is as described above.

During the collection of urine samples via the automated collection system and via cystocentesis during weeks 5, 10 and 15, if a cat undergoes collection on Day 1 of week 5, the cat will undergo collection on Day 1 of weeks 10 and 15; if a cat undergoes collection on Day 2 of week 5, the cat will undergo collection on Day 2 of weeks 10 and 15; and so on.

Table 2 is a comparison of the urine pH of samples collected via the automated urine collection system and via cystocentesis:

TABLE 2

| Cat Identity | Diet | Week | Urine pH Urine Collection System | Urine pH Cystocentesis |
|---|---|---|---|---|
| Cat #9 | Control | 5 | 7.1 | 6.9 |
| | Test | 10 | 7.3 | 7.5 |
| | Test | 15 | 7.5 | 7.3 |
| Cat #10 | Test | 5 | 7.8 | 7.4 |
| | Control | 10 | 6.7 | 6.3 |
| | Control | 15 | * | 6.4 |
| Cat #11 | Test | 5 | 7 | 6.1 |
| | Control | 10 | 7.2 | 6.6 |
| | Control | 15 | 6.4 | 7.3 |
| Cat #12 | Control | 5 | 6.5 | * |
| | Test | 10 | 7.3 | 7.4 |
| | Test | 15 | 7.3 | 6.1 |
| Cat #13 | Test | 5 | 7.8 | 8.1 |
| | Control | 10 | 6.5 | 6.2 |
| | Control | 15 | 6.7 | 7.1 |
| Cat #14 | Test | 5 | 8 | 7.2 |
| | Control | 10 | 6.9 | * |
| | Control | 15 | * | 6.6 |
| Cat #15 | Control | 5 | 6.8 | 6.1 |
| | Test | 10 | 7.3 | 7.4 |
| | Test | 15 | 7.4 | 8.2 |
| Cat #16 | Test | 5 | 6.9 | 7.4 |
| | Control | 10 | 6.8 | 6.5 |
| | Control | 15 | * | 5.9 |
| Cat #17 | Test | 5 | * | 8.1 |
| | Control | 10 | 7.4 | 6.9 |
| | Control | 15 | 7 | 7.2 |
| Cat #18 | Control | 5 | 6.7 | 6.3 |
| | Test | 10 | 7.5 | 7.1 |
| | Test | 15 | 7.3 | 7.9 |
| Cat #19 | Control | 5 | 6.9 | 7.4 |
| | Test | 10 | 7.4 | 7.7 |
| | Test | 15 | * | 7.2 |
| Cat #20 | Control | 5 | 6.3 | 6.4 |
| | Test | 10 | 7.6 | 7 |
| | Test | 15 | 7.3 | 7.8 |

* Data not collected

Figure 18:
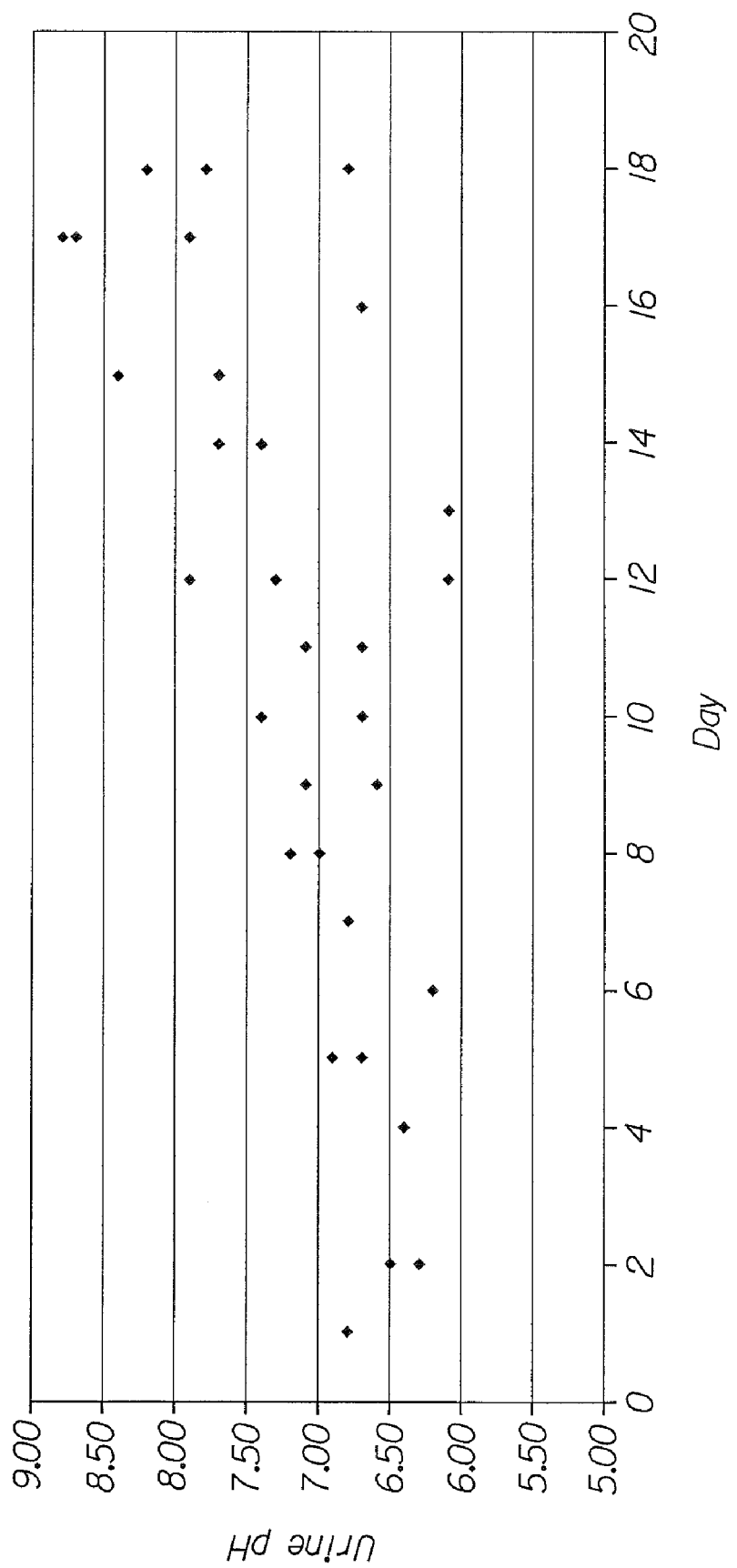
FIG. 18 is an illustration of daily urine pH values collected via an automated urine collection system for Cat #15 of Experiment 2 of the Example.

FIG. 18 is an illustration of daily urine pH values collected via the automated urine collection system for Cat #15. The illustration is of an 18 day period within the time period of Experiment #2 as described above. The first nine days shown, Cat #15 is on the Control diet. The last nine days shown, Cat #15 is on the Test diet. As shown in FIG. 18, daily collection of urine via an automated urine collection system allows for an evaluation of changes in urine pH with the change from the Control diet to the Test diet.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of evaluating excrement from group-housed animals in an excrement elimination event, the method comprising the steps of:
   a. providing a primary enclosure;
   b. providing at least two animals within said primary enclosure;
   c. providing at least one automated collection system within said primary enclosure, said automated collection system comprising:
      i. a collection system detection means for detecting an animal;
      ii. an excrement sample collection area;
      iii. at least two storage containers;
   d. associating an identifier with each of said animals;
   e. detecting one of said identifiers within said excrement sample collection area with said collection system detection means in an excrement elimination event;
   f. collecting said detected animal's excrement from said excrement sample collection area;
   g. obtaining excrement elimination event data.

2. The method of claim 1 further comprising the step of placing said collected excrement into one of said storage containers.

3. The method of claim 1 further comprising the step of identifying said excrement containing storage container.

4. The method of claim 3 further comprising the step of correlating said identified excrement containing storage container with said identifier of said detected animal.

5. The method of claim 1 wherein said automated collection system is selected from the group consisting of a urine collection system, a fecal collection system, and a combination urine/fecal collection system.

6. The method of claim 1 wherein said excrement is selected from the group consisting of urine, feces and combinations thereof.

7. The method of claim 1 wherein said excrement elimination event data is selected from the group consisting of utilization data, technical data, and combinations thereof.

8. The method of claim 7 wherein said utilization data is selected from the group consisting of identity of said animal, data, time said animal entered said automated collection system, time said animal exited said automated collection system, total amount of time said animal was within said automated collection system, location of storage container, and combinations thereof.

9. The method of claim 7 wherein said technical data is selected from the group consisting of volume, weight, collection and characterization of crystals, ion content, pH, specific gravity, temperature, osmolarity, imagery of said excrement sample, and combinations thereof.

10. The method of claim 1 wherein said animals are companion animals.

11. The method of claim 1 wherein said animal is detected upon entrance into the excrement sample collection area.

12. The method of claim 1 wherein said animal is detected upon exit from the excrement sample collection area.

13. The method of claim 1 further comprising the step of performing a flush cycle to clean said excrement sample collection area.

14. The method of claim 1 wherein said automated collection system comprises infrared beams.

15. The method of claim 1 wherein said automated collection system further comprises a data collection chamber.

16. The method of claim 1 further comprising the steps feeding said animal within said primary enclosure, the method comprising the steps of:
   a. providing an automated feeding station within said primary enclosure, said automated feeding station comprising;
      i. at least one feeding area;
      ii. at least one food container within said food area, said food container comprising a food suitable for consumption by said animal;
   b. detecting one of said identifiers within said feeding area;
   c. presenting said food container to said animal;
   d. feeding said detected animal in a feeding event; and
   e. obtaining feeding event data.

17. The method of claim 16 further comprising the step of correlating said feeding event data of said animal to said excrement elimination event data of said animal.

18. The method of claim 17 wherein an amount of food consumed, a total amount of food consumed, and a time of consumption is correlated with said excrement elimination event data.

19. A method of evaluating excrement from group-housed animals in an excrement elimination event, the method comprising the steps of:
   a. providing a primary enclosure;
   b. providing at least two animals within said primary enclosure;
   c. providing at least one automated collection system within said primary enclosure, said automated collection system comprising:
      i. a collection system detection means for detecting an animal;
      ii. an excrement sample collection area;
      iii. a data collection chamber;
      iv. at least two storage containers;
   d. associating an identifier with each of said animals;
   e. detecting one of said identifiers within said excrement sample collection area with said detection means in an excrement elimination event;
   f. collecting said detected animal's excrement from said excrement sample collection area;
   g. obtaining excrement elimination event data;
   h. placing said collected excrement into one of said storage containers;
   i. identifying said excrement containing storage container to correlate with said identifier of said detected animal; and
   j. repeating steps (e) through (i) with another of said storage containers.

20. The method of claim 19 wherein said excrement elimination event data is selected from the group consisting of utilization data, technical data and combinations thereof.

21. The method of claim 20 wherein said utilization data is selected from the group consisting of identity of said animal, date of said excrement elimination event, time said animal entered said automated collection system, time said animal exited said automated collection system, total amount of time said animal was within said automated collection system, location of said storage container, and combinations thereof.

22. The method of claim 20 wherein said technical data is selected from the group consisting of volume, weight, collection and characterization of crystals, ion content, pH, specific gravity, temperature, osmolarity, imagery of said excrement, and combinations thereof.

23. The method of claim 19 further comprising the steps feeding said animal within said primary enclosure, the method comprising the steps of:
   a. providing an automated feeding station within said primary enclosure, said automated feeding station comprising;
      i. at least one feeding area;
      ii. at least one food container within said food area, said food container comprising a food suitable for consumption by said animal;
   b. detecting one of said identifiers within said feeding area;
   c. presenting said food container to said animal; and feeding said detected animal in a feeding event.

24. The method of claim 23 further comprising the step of correlating said feeding event of said animal to said excrement elimination event data of said animal.

25. A method of evaluating the impact of a diet composition on an animal's urinary tract health or gastrointestinal tract health, the method comprising the steps of:
   a. providing a primary enclosure;
   b. providing at least two animals within said primary enclosure;
   c. providing at least one automated collection system within said primary enclosure, said automated collection system comprising:
      i. a collection system detection means for detecting an animal;
      ii. an excrement sample collection area;
      iii. at least two storage containers;
   d. providing at least one automated feeding station within said primary enclosure, said automated feeding station comprising:
      i. a feeding station detection means for detecting an animal
      ii. at least one feeding area;
      iii. at least one food container within said feeding area, said food container comprising a food suitable for consumption by said animals;
   e. associating an identifier with each of said animals;
   f. detecting one of said identifiers within said feeding area;
   g. presenting said food container to said detected animal and feeding said detected animal in a feeding event;
   h. obtaining feeding event data from said feeding event;
   i. detecting said detected animal within said excrement sample collection area of said automated collection system;
   j. collecting said detected animal's excrement from said excrement sample collection area;
   k. obtaining excrement elimination event data; and
   l. correlating said feeding event data of said detected animal to said excrement elimination event of said detected animal.

* * * * *